(12) United States Patent
Sone et al.

(10) Patent No.: US 8,227,950 B2
(45) Date of Patent: Jul. 24, 2012

(54) ROLLING BEARING, SPINDLE SUPPORT STRUCTURE OF MAIN MOTOR FOR RAILWAY VEHICLE, AND BEARING STRUCTURE

(75) Inventors: Katsunori Sone, Kron (FR); Hideji Ito, Kuwana (JP); Tsukasa Yamakawa, Yokkaichi (JP); Naoaki Tsuji, Inabe (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/237,023

(22) Filed: Sep. 20, 2011

(65) Prior Publication Data

US 2012/0027332 A1 Feb. 2, 2012

Related U.S. Application Data

(62) Division of application No. 11/992,060, filed as application No. PCT/JP2006/316964 on Aug. 29, 2006, now Pat. No. 8,044,544.

(30) Foreign Application Priority Data

| Sep. 15, 2005 | (JP) | 2005-268593 |
| Oct. 28, 2005 | (JP) | 2005-314286 |
| Nov. 9, 2005 | (JP) | 2005-325210 |
| Nov. 9, 2005 | (JP) | 2005-325211 |
| Nov. 24, 2005 | (JP) | 2005-339202 |

(51) Int. Cl.
*H02K 5/16* (2006.01)

(52) U.S. Cl. .......................................... 310/90; 384/548

(58) Field of Classification Search ............... 384/548, 384/565; 310/90
See application file for complete search history.

(56) References Cited

U.S. PATENT DOCUMENTS

| 1,722,488 | A | | 7/1929 | Bott et al. | |
| 3,602,150 | A | * | 8/1971 | Frost et al. | 104/172.4 |
| 3,899,226 | A | | 8/1975 | Frost et al. | |
| 4,021,086 | A | * | 5/1977 | Rajsigl | 384/473 |
| 7,592,798 | B2 | * | 9/2009 | Yabe et al. | 324/174 |
| 7,766,555 | B2 | * | 8/2010 | Kono et al. | 384/572 |
| 2005/0206249 | A1 | | 9/2005 | Hashiba et al. | |
| 2007/0152657 | A1 | | 7/2007 | Yabe et al. | |
| 2009/0010585 | A1 | | 1/2009 | Nakajima et al. | |
| 2010/0166352 | A1 | * | 7/2010 | Morita et al. | 384/462 |
| 2011/0059418 | A1 | | 3/2011 | Damato et al. | |

FOREIGN PATENT DOCUMENTS

| FR | 2 792 378 | 10/2000 |
| JP | 57-6550 | 1/1982 |
| JP | 60-075440 | 5/1985 |
| JP | 6-229425 | 8/1994 |
| JP | 08-338426 | 12/1996 |
| JP | 2001-355639 | 12/2001 |
| JP | 2002-181050 | 6/2002 |

(Continued)

*Primary Examiner* — Thanh Lam
(74) *Attorney, Agent, or Firm* — Clark & Brody

(57) ABSTRACT

A rolling bearing as a ball bearing comprising an inner ring; an outer ring having the same axial width as said inner ring; balls arranged between said inner ring and said outer ring; and a sealing member having a roughly channel-shaped configuration in cross section projecting from both end faces of said inner ring and said outer ring. A relation between a diameter A of said ball and an axial width W of said inner ring and said outer ring satisfies A/W≧0.4, and a relation between a bearing volume V of said ball bearing and an internal space capacity C of said ball bearing satisfies 0.35≦C/V≦0.55.

2 Claims, 14 Drawing Sheets

FOREIGN PATENT DOCUMENTS

| | | |
|---|---|---|
| JP | 2003-13971 | 1/2003 |
| JP | 2004-075041 | 3/2004 |
| JP | 2004-092719 | 3/2004 |
| JP | 2004-316757 | 11/2004 |
| JP | 2004-346972 | 12/2004 |
| JP | 2005-180531 | 7/2005 |
| JP | 2005-207264 | 8/2005 |
| JP | 2005-283742 | 10/2005 |

* cited by examiner

ROLLING BEARING, SPINDLE SUPPORT STRUCTURE OF MAIN MOTOR FOR RAILWAY VEHICLE, AND BEARING STRUCTURE

TECHNICAL FIELD

The present invention relates to a rolling bearing and more particularly, to a rolling bearing required to have a long lubrication life of grease.

The present invention relates to a rolling bearing and more particularly, to a spindle support structure of a main motor for a railway vehicle having an insulation layer on a track ring.

BACKGROUND ART

Conventionally, a cylindrical roller bearing and a deep groove ball bearing are used as a bearing used in a main motor for a railway vehicle. For example, a cylindrical roller bearing 1 shown in FIG. 17 comprises an inner ring 2, an outer ring 3, cylindrical rollers 4 as rolling bodies arranged between the inner ring 2 and the outer ring 3, and a retainer 5 retaining intervals of the cylindrical rollers 4.

In addition, according to the cylindrical roller bearing 1 used in the main motor for the railway vehicle, an insulation layer 3a is formed on an outer diameter surface and both end faces of the outer ring 3 in order to prevent damage of the bearing due to electric corrosion. The insulation layer 3a is formed by spraying an insulation material such as ceramics.

In addition, since the main motor for the railway vehicle is used outdoors, in a case of an open-type bearing having a grease pocket in a bearing peripheral structure, grease could deteriorate due to entering of dust. Thus, a cylindrical roller bearing 41 shown in FIG. 1 is a sealed-type bearing in order to prevent grease from deteriorating due to entering of dust and in order to lengthen a maintenance cycle.

Meanwhile, according to the conventional cylindrical roller bearing 1 shown in FIG. 17, when a relation between a length $L_1$ of the roller 4 and an axial width $W_1$ of the inner ring 2 and the outer ring 3 satisfies $L_1/W_1 \geq 0.4$, that is, a ratio of the roller length $L_1$ to the axial width $W_1$ is high, a bearing volume $V_1$ and an internal space capacity $C_1$ are designed so that a relation between them satisfies $C_1/V_1 \approx 0.2$, and a diameter $A_1$ of the roller 4 and a bearing thickness dimension $T_1$ are designed so that a relation between them satisfies $0.25 \leq A_1/T_1 \leq 0.55$ in general.

In addition, the "bearing volume" in this specification designates a volume surrounded by an inner diameter surface of the inner ring and an outer diameter surface of the outer ring and end faces of the inner and outer rings of the bearing, and according to the example shown in FIG. 17, it is calculated by the following formula using an outer diameter dimension $D_1$ of the outer ring 3, an inner diameter dimension $d_1$ of the inner ring 2, the axial width $W_1$, and pi $\pi$.

$$V_1 = \frac{\pi \times \left( \left(\frac{D_1}{2}\right)^2 - \left(\frac{d_1}{2}\right)^2 \right) \times W_1}{1000} \qquad \text{[Formula 1]}$$

In addition, the "internal space capacity" in this specification designates a space surrounded by the inner ring, the outer ring, and the sealing seal.

According to the cylindrical roller bearing provided within the above range, since the bearing internal space capacity $C_1$ is small, the problem is that an appropriate amount of grease to ensure a bearing life required in the bearing for the railway vehicle main motor cannot be enclosed. In addition, the same is true in a ball bearing shown in FIG. 18.

The ball bearing shown in FIG. 18 comprises an inner ring 12, an outer ring 13 having an insulation layer 13a, balls 14 arranged between the inner ring 12 and the outer ring 13, and a retainer 15 retaining intervals of the balls 14. Thus, when a relation between a diameter $A_2$ of the ball 14 and an axial width $W_2$ of the inner ring 12 and the outer ring 13 satisfies $A_2/W_2 \geq 0.4$, a bearing volume $V_2$ and an internal space capacity $C_2$ are designed so that a relation between them satisfies $C_2/V_2 \approx 0.3$, and the diameter $A_2$ of the ball 14 and a bearing thickness dimension $T_2$ are designed so that a relation between them satisfies $0.4 \leq A_2/T_2 \leq 0.6$ in general.

To increase a supplying ratio of the grease to the internal space capacity can be a way of solving the above problem, but in this case, since stirring resistance of the grease is increased while the bearing is rotated, and especially at the time of starting, so that the temperature of the bearing could be abruptly increased, which is not appropriate.

Thus, a sealed-type cylindrical roller bearing in which an appropriate amount of grease can be ensured is disclosed in Japanese Unexamined Patent Publication No. 2003-13971 and Japanese Unexamined Patent Publication No. 2004-346972, for example.

As shown in FIG. 19, a cylindrical roller bearing 21 described in the Japanese Unexamined Patent Publication No. 2003-13971 comprises an inner ring 22 having a long axial width, an outer ring 23, cylindrical rollers 24 arranged between the inner ring 22 and the outer ring 23, a retainer 25 retaining intervals of the cylindrical rollers 24, and a sealing seal 26 of an L shape in cross section to enclose grease in the bearing. The sealing seal 26 is manufactured by covering a cored bar 26a with an insulation resin 26b. In addition, an insulation layer is formed on an outer diameter surface and both end faces of the outer ring 23.

In addition, as shown in FIG. 20, a cylindrical roller bearing 31 described in the Japanese Unexamined Patent Publication No. 2004-346972 comprises an inner ring 32, an outer ring 33, cylindrical rollers 34 arranged between the inner ring 32 and the outer ring 33, a retainer 35 retaining intervals of the cylindrical rollers 34, and a sealing seal 36 having a channel-shaped configuration projecting from both end faces of the inner ring 32 and the outer ring 33, and an outer diameter surface and both end faces of the outer ring 33 is covered with an insulation material 33a. In addition, the sealing seal 36 is in the form of the channel shape projecting from both end faces of the inner ring 32 and the outer ring 33, and fixed to the outer ring 33 by a stopper 36a. According to the cylindrical roller bearing 31 described in the above document, since the sealing seal 36 projecting from the end face of the bearing functions as a grease pocket, an amount of grease that can be enclosed in the bearing is increased.

However, when the projecting amount of the sealing seal 26, 36 is small, an appropriate amount of grease cannot be enclosed as a result, and when the projecting amount of the sealing seal 26, 36 is large, as grease existing at a position far from the center of the bearing does not contribute to the lubrication of the bearing at all. However, there is no description of the appropriate projecting amount of the sealing seal 26, 36 in the above document.

Furthermore, according to the cylindrical roller bearing 21 shown in FIG. 19, since the inner ring 22 has a specific configuration, a standard product cannot be used for it. As a result, manufacturing cost of the cylindrical roller bearing 21 is increased.

In addition, the cylindrical roller bearing 31 having the above constitution has the problem that when the viscosity of the grease is lowered due to an increase in temperature at the time of rotation of the bearing, the grease in the grease pocket is concentrated at the lower part of the bearing. When such grease flows into the bearing in large amounts, stirring resistance is increased and a temperature could rise abruptly.

Thus, according to the cylindrical roller bearing 31 shown in FIG. 20, the grease pocket is divided into a plurality of regions by weirs 37 projecting from an inner wall surface of the sealing seal 36 so that the grease can be uniformly distributed in the grease pocket. Thus, the grease is prevented from congregating on the lower side of the bearing.

However, according to the sealing seal 36 used in the cylindrical roller bearing 31 shown in FIG. 20, the plurality of weirs 37 are arranged at the same intervals. When such cylindrical roller bearing 31 supports the rotation shaft extending in the horizontal direction, the weirs 37 arranged on the right and left sides of the rotation shaft can prevent the grease from flowing from the upper part to the lower part of the bearing effectively. However, the weirs provided on upper and lower sides of the rotation shaft do not contribute to retaining of grease so much.

In addition, although the sealing seal 36 used in the cylindrical roller bearing 31 shown in FIG. 20 can prevent the grease in the grease pocket from concentrating at the lower part of the bearing, it cannot prevent the grease in the grease pocket from flowing into the bearing excessively. When the grease more than necessary flows into the bearing, the stirring resistance is increased and the temperature of the bearing rises.

Furthermore, according to the cylindrical roller bearing 31 shown in FIG. 20, at the time of rotating, the outer ring 33 and the sealing seal 36 do not move and the inner ring 32 rotates with the rotation of the shaft. Thus, in order to prevent the sealing seal 36 from being damaged by the contact between the inner ring 32 and the sealing seal 36, it is necessary to provide a gap between the inner ring 32 and the sealing seal 36 to some extent.

When this gap is too small, the inner ring 32 could come into contact with the sealing seal 36 during the rotation of the bearing due to a manufacturing error of the sealing seal 36 and the like. Meanwhile, when it is too large, the grease cannot be prevented from leaking and dust could enter from the outside.

In addition, the seal having the grease pocket is mounted on the rolling bearing after the grease has been enclosed. The grease is enclosed in the grease pocket of the seal by a spot enclosing method using a grease enclosing device having a grease inlet and a grease outlet in general.

Here, one example of the enclosing method of the grease will be briefly described. First, a structure of the grease enclosing device will be described. FIG. 21 is a sectional view showing a part of the grease enclosing device, and FIG. 22 is a view of the grease enclosing device shown in FIG. 21 seen from a direction of an arrow Z of FIG. 21. Referring to FIGS. 21 and 22, the grease enclosing device 21 comprises a grease inlet 122 through which the grease is supplied from the outside 125 to the grease enclosing device 121, a guiding part 123 guiding the grease from the grease inlet 122 to a grease outlet 124, a plurality of grease outlets 124 through which the grease is discharged into a grease pocket 126, and a seal mounting surface 130 positioned at a lower part of the grease enclosing device 121 and comprising the plurality of grease outlets 124.

Next, the grease enclosing method will be described with reference to FIGS. 21 and 22. First, a seal 131 having the grease pocket 126 is mounted on the lower part of the seal mounting surface 130. Next, grease 127 is supplied from the outside 125 to the grease inlet 122. Thus, the grease 127 supplied into the grease enclosing device 121 flows in the directions shown by arrows X and Y shown in FIG. 21 through the guiding part 123 and reaches the plurality of grease outlets 124. Then, the grease 127 is discharged from the plurality of grease outlets 124 and supplied to the grease pocket 126 of the seal 131. Thus, the grease 127 is enclosed in the grease pocket 126.

When the grease 127 is enclosed in the grease pocket, in the case where the consistency of the grease 127 is not appropriate, the grease 127 could not been appropriately enclosed in the grease pocket 126.

This will be described in detail with reference to FIG. 23. FIG. 23 is a view showing a state in which the grease 127 having a low consistency is enclosed in the grease pocket 126 of the seal 131. Referring to FIG. 23, in the case where the consistency of the sealed grease 127 to be enclosed is low, that is, the grease 127 is in a hard state, when the grease 127 is enclosed in the grease pocket 126 of the seal 131, it is accumulated in the vicinity of a just lower part of the grease outlet 124 in a solid state. In this case, a space 129 is generated in the grease pocket 126 of the seal 131, specifically, on the side of an inner wall surface 128 of the grease pocket 126. In this case, even after the grease 127 has been discharged from the grease outlet 124 and the enclosing of the grease 127 has been completed, the space 129 still exists.

Since the grease 127 is not provided at the space 129, that space 129 is wasted in the grease pocket 126. The amount of the grease 127 enclosed in this state is not enough for maintaining a lubricating property for a long time.

In addition, the grease 127 is not in contact with the inner wall surface 128 of the grease pocket 126 at this space 129. The grease 127 that is not in contact with the inner wall surface 128 of the grease pocket 126 is low in retention force, so that it drops out of the grease pocket 126 easily. When it drops out, a large amount of the grease 127 flows in the bearing at one time, and this could cause abnormal heat generation due to an increase in stirring resistance.

Meanwhile, in the case where the consistency of the grease 127 to be enclosed is high, that is, the grease 127 is in a soft state, when the grease 127 is enclosed, the above problem does not arise and the grease 127 is supplied to the inner wall surface 128 of the grease pocket 126 and enclosed without any space.

However, since the consistency of the sealed grease 127 is high, its fluidity is high and retention force in the grease pocket 126 is low, so that the grease 127 easily drops out of the grease pocket 126. Especially, when the grease 127 is enclosed in the grease pocket 126 having large capacity, the degree of freedom of the movement is high, so that the retention force of the grease 127 in the grease pocket 126 have to be high. However, when the consistency of the grease 127 is high, the retention force is not enough and a large amount of grease 127 flows in the rolling bearing at one time and as a result, abnormal heat could be generated due to an increase in stirring resistance.

When the rolling bearing having the above problem is used in the spindle support structure supporting the spindle of the main motor for the railway vehicle, it could not be used for a long period of time.

DISCLOSURE OF THE INVENTION

Thus, it is an object of the present invention to provide a rolling bearing having a long maintenance cycle by providing a structure capable of enclosing an appropriate amount of grease, and specifying a bearing internal space capacity.

It is another object of the present invention to provide a rolling bearing having a long maintenance cycle by providing an appropriate space between a rotation side track ring and a sealing member.

It is still another object of the present invention to provide a rolling bearing capable of keeping a long-term lubricating property and a spindle support structure of a main motor for a railway vehicle that can be used for a long period of time.

It is still another object of the present invention to provide a rolling bearing comprising a sealing member capable of preventing uneven distribution of the grease.

It is still another object of the present invention to provide a rolling bearing comprising a sealing member capable of preventing grease from flowing into the bearing excessively.

A rolling bearing according to the present invention comprises an inner ring, an outer ring having the same axial width as the inner ring, rollers arranged between the inner ring and the outer ring, and a sealing member having a roughly channel-shaped configuration in cross section projecting from both end faces of the inner ring and the outer ring. Thus, a relation between a length L of the roller and an axial width W of the inner ring and outer ring satisfies $L/W \geq 0.4$, and a relation between a bearing volume V of the rolling bearing and an internal space capacity C of the rolling bearing satisfies $0.25 \leq C/V \leq 0.55$.

In the case of the bearing in which $L/W \geq 0.4$, that is, the ratio of the roller length to the axial width of the bearing is high, when the internal space capacity C is set within the above range, an appropriate amount of grease can be enclosed in the bearing. As a result, the rolling bearing can be superior in lubricating performance and its maintenance cycle can be lengthened.

In order to ensure the above internal space capacity C, a relation between a roller diameter A of the roller and a projecting amount B of the sealing member from the end faces of the inner ring and the outer ring satisfies $0.15 \leq B/A \leq 1.0$.

Preferably, an insulation layer is formed on an outer diameter surface and end faces of the outer ring. Thus, even when the bearing is used for the main motor of the railway vehicle, for example, the damage of the bearing due to electric corrosion can be prevented.

Preferably, an insulation layer is formed on an inner diameter surface and end faces of the inner ring. Since the inner diameter surface of the inner ring is small in spraying area as compared with the outer diameter surface of the outer ring, when the insulation material is sprayed to the inner diameter surface of the inner ring, the spraying cost can be reduced. In addition, since the insulation layer does not interfere with a contact part between the sealing seal and the track ring, a fixing method of the sealing seal can be simple.

Preferably, a relation between an inner diameter dimension "1" of the sealing member and a gap δ between a wall surface of the sealing member opposed to the inner ring and the inner ring satisfies $δ/1 \leq 0.015$. When the gap δ between the inner ring and the sealing member is set within the above range, the grease enclosed in the bearing can be effectively prevented from leaking and dust can be effectively prevented from entering from the outside of the bearing. As a result, the maintenance cycle of the rolling bearing can be lengthened.

Preferably, the relation between the inner diameter dimension "1" of the sealing member and the gap δ between the wall surface of the sealing member opposed to the inner ring and the inner ring satisfies $δ/1 \geq 0.003$. From the viewpoint of the sealing performance of the sealing member, the smaller the gap between the inner ring and the sealing member is better. However, in view of a manufacturing error of the sealing member, δ cannot be zero. Thus, since the gap δ between the inner ring and the sealing member is set within the above range, even when the manufacturing error is generated in the sealing member to some extent, the inner ring can be prevented from being in contact with the sealing member at the time of the bearing rotation. Preferably, the sealing member has grease inside it, and a consistency of the grease is 260 to 300. Since the seal comprises the grease pocket, a large amount of grease can be enclosed, and since the consistency of the grease to be enclosed is 260 to 300, the grease can be appropriately enclosed in the grease pocket.

More specifically, since the consistency of the grease is more than 260, an empty space is not generated in the grease pocket after the grease has been enclosed in the grease pocket, so that a grease amount required to maintain the lubricating performance for a long time can be ensured. Furthermore, since there is no part where the grease is not in contact with the inner wall surface of the grease pocket, the retention force in the grease pocket can be high. In addition, when the consistency of the grease is smaller than 300, the retention force can be high into the grease pocket at the time of use, so that a large amount of grease does not flow in the rolling bearing at one time. Therefore, the rolling bearing can maintain the lubricating property for a long period of time.

Preferably, a base oil viscosity of the grease at 40° C. is 90 to 150 cSt. The grease to be enclosed comprises base oil (lubricant oil), a thickening agent, an additive agent and the like and when the base oil viscosity at 40° C. is defined as described above, the rolling bearing can maintain the lubricating property for a long period of time.

Preferably, the sealing member has a weir for dividing the inside in a circumferential direction, and an identification mark for specifying a position of the weir on an outer wall surface. Since the identification mark to specify the position of the weir in the sealing member is located at the position so that it can be seen, the bearing can be arranged so as to be able to effectively prevent the imbalance of the grease according to the supported rotation shaft.

Preferably, the sealing member comprises a first weir part and a second weir part provided at positions at an angle of about 180° to the center thereof. Thus, when the rotation shaft extending in the horizontal direction is supported, for example, the imbalance of the grease can be efficiently prevented by arranging the first weir part and the second weir part on the right and left side of the rotation shaft.

Further preferably, each of the first weir part and the second weir part has a plurality of weirs. Thus, since the plurality of weirs are provided in each of the first weir part and the second weir part, the imbalance of the grease can be prevent more efficiently.

For example, the identification mark is provided at a position at an angle of about 90° from the first weir part and the second weir part to the center of the sealing member. In this case, the identification mark is to be arranged on the upper side or the lower side of the rotation shaft in order to arrange the first weir part and the second weir part on the right and left sides of the rotation shaft.

Preferably, the sealing member is manufactured by injection molding with a resin material, and the identification mark is a projection formed at a position corresponding to an inlet at the time of injection molding. In the case of the injection molding, the projection is formed at the position corresponding to the inlet in a finished product. When this projection is used as the identification mark, it is not necessary to provide a new step of forming the identification mark, so that the manufacturing step is not increased.

According to the present invention, when the position of the weir in the sealing member can be specified from the outside, the rolling bearing can be arranged so as to effectively prevent the imbalance of the grease according to the rotation shaft to be supported.

Preferably, the sealing member has a weir at its opening end, and the opening end of the sealing member has a closed part covered with the weir, and an opening not covered with the weir. In addition, it is preferable that the weir is continuously provided in the circumferential direction of the sealing member. According to the rolling bearing having the above constitution, the projecting part of the sealing member is used as the grease pocket. Thus, when the opening end of the grease pocket is partially covered with the weir, a grease amount flowing into the bearing through the grease pocket can be adjusted.

Preferably, the opening is provided on the outer diameter side in the sealing member. Thus, the grease can be efficiently supplied into the bearing. Because, as the grease in the grease pocket flows into the bearing along the wall surface of the sealing member, when the bearing is the inner ring rotation type bearing, it flows in along a wall surface on the outer diameter side due to centrifugal force generated by the rotation of the inner ring.

Preferably, a relation between a radial dimension "t" of the opening and a diameter "d" of the rolling body satisfies 1 mm $\leq t \leq 0.4d$. Thus, the appropriate amount of grease can be supplied into the bearing. In addition, when the radial dimension "t" is less than 1 mm, the opening is too small and the smooth flow of the grease is prevented. Meanwhile, the radial dimension "t" exceeds 40% of the rolling body diameter "d", the opening is too large and the weir cannot be the resistance against excessive influx.

Preferably, the sealing member and the weir are formed separately as different members. Although the sealing member and the weir themselves are simple in structure, combined configuration of them is complicated. Thus, the sealing member and the weir are separately manufactured and then combined to simplify the manufacturing process.

Preferably, the track ring has an insulation layer and the sealing member is formed of a resin material. For example, when the bearing is used for supporting the main motor of the railway vehicle, it is necessary to prevent the bearing from being damaged by electric corrosion. Thus, when the insulation layer is formed on the track ring and the sealing member is formed of the resin material having high insulation performance, the insulation performance of the bearing can be improved as a whole.

A spindle support structure of a main motor for a railway vehicle comprises the above-described rolling bearing, and a spindle of a main motor for a railway vehicle, and the spindle is supported by the rolling bearing. According to the above constitution, the spindle support structure of the main motor for the railway vehicle is durable for a long period of time.

A bearing structure according to the present invention comprises the rolling bearing described above and a peripheral member arranged so as to be opposed to the sealing member, and a labyrinth structure is formed by the sealing member and the peripheral member. According to the above constitution, dust can be efficiently prevented from entering from the outside. As a result, the bearing structure can be superior in sealing performance.

Preferably, the sealing member has a projection and a recession along a surface opposed to the peripheral member. In addition, preferably, the peripheral member has a projection and a recession along a surface opposed to the sealing member. Furthermore, it is preferable that the projection and the recession form a circumferential groove. When the projection and the recession such as the circumferential grooves are provided at the sealing member and/or peripheral member, the sealing effect of the labyrinth structure can be improved.

A rolling bearing according to the present invention comprises an inner ring, an outer ring having the same axial width as the inner ring, balls arranged between the inner ring and the outer ring, and a sealing member having a roughly channel-shaped configuration in cross section projecting from both end faces of the inner ring and the outer ring. Thus, a relation between a diameter A of the ball and an axial width W of the inner ring and the outer ring satisfies $A/W \geq 0.4$, and a relation between a bearing volume V of the ball bearing and an internal space capacity C of the ball bearing satisfies $0.35 \leq C/V \leq 0.55$.

As for the ball bearing also, when a ratio of a rolling body diameter to an axial width of the bearing is high, it is necessary to set the internal space capacity C within the above range to enclose an appropriate amount of grease.

Furthermore, in order to ensure the internal space capacity C, a relation between the diameter A of the ball and a projecting amount B of the sealing member from the end faces of the inner ring and the outer ring satisfies $0.1 \leq B/A \leq 0.6$, for example.

According to the present invention, the rolling bearing is superior in lubricating performance and its maintenance cycle can be lengthened by specifying the bearing internal space and the projecting amount of the sealing seal having the roughly channel-shaped configuration required to enclose the appropriate amount of grease. In addition, since the sealing seal and the peripheral member form the labyrinth structure, the bearing structure is superior in sealing performance.

Furthermore, according to the present invention, since the gap 6 between the inner ring and the sealing member is set within a range of $0.003 \leq \delta \leq 0.015$, the maintenance cycle of the rolling bearing can be lengthened.

In addition, according to the present invention, since the seal comprises the grease pocket, a large amount of grease can be enclosed and since the consistency of the grease to be enclosed is set within the range of 260 to 300, the grease can be enclosed in the grease pocket appropriately. Thus, the lubricating property in the rolling bearing can be maintained for a long period of time.

In addition, the spindle support structure of the main motor for the railway vehicle comprising the rolling bearing and the spindle used in the main motor for the railway vehicle is durable for a long period of time.

Furthermore, according to the present invention, since the position of the weir in the sealing member can be specified from the outside, the rolling bearing can be arranged to efficiently prevent the imbalance of the grease according to the rotation shaft to be supported.

BEST MODE FOR CARRYING OUT THE INVENTION

Figure 1:
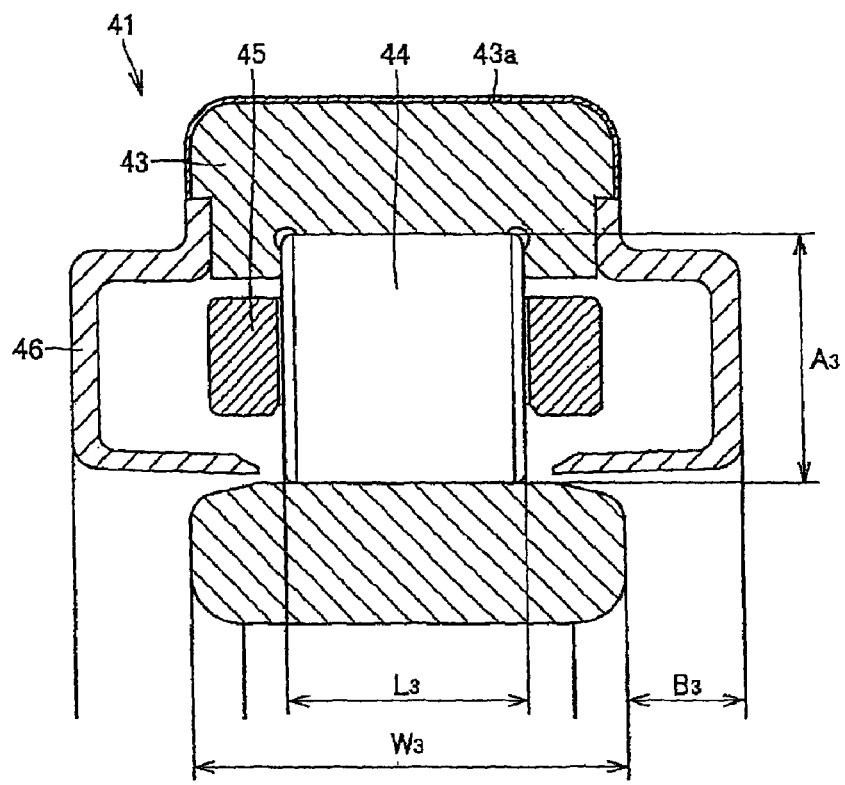
FIG. 1 is a view showing a cylindrical roller bearing according to one embodiment of the present invention.

A cylindrical roller bearing 41 according to one embodiment of the present invention will be described with reference to FIG. 1.

The cylindrical roller bearing 41 comprises an inner ring 42, an outer ring 43 having the same axial width as the inner ring 42 and having an insulation layer 43$a$ formed on an outer diameter surface and both end faces thereof, cylindrical rollers 44 as rolling bodies arranged between the inner ring 42 and the outer ring 43, a retainer 45 retaining intervals of the cylindrical rollers 44, and a sealing seal 46 as a sealing member having a roughly channel-shaped configuration in cross section projecting from both end faces of the inner ring 42 and the outer ring 43. In addition, the insulation layer 43$a$ is formed by spraying an insulation material such as ceramics, and grease is enclosed in an internal space of the bearing.

Figure 2A:
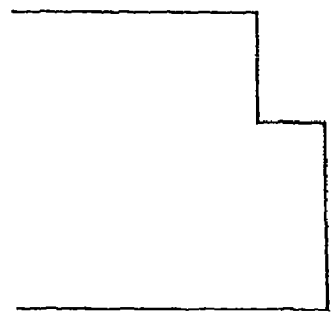
FIG. 2A is a view showing one example of a roughly channel-shaped configuration.
Figure 2B:
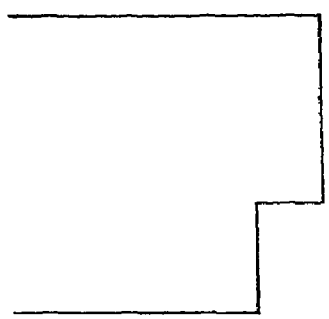
FIG. 2B is a view showing another example of the roughly channel-shaped configuration.
Figure 2C:
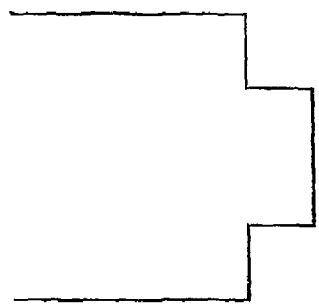
FIG. 2C is a view showing still another example of the roughly channel-shaped configuration.
Figure 2D:
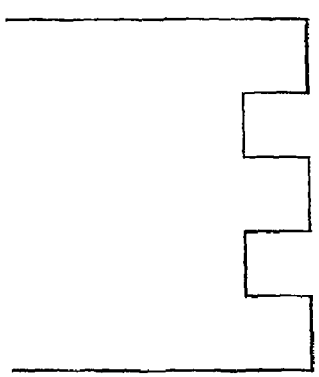
FIG. 2D is a view showing still another example of the roughly channel-shaped configuration.
Figure 2E:
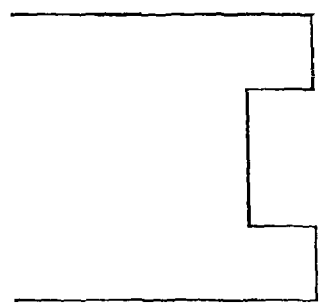
FIG. 2E is a view showing still another example of the roughly channel-shaped configuration.
Figure 2F:
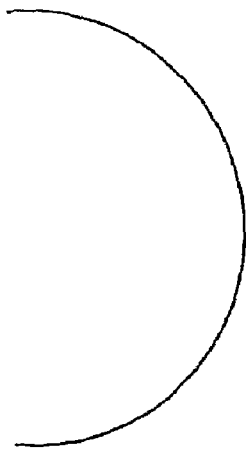
FIG. 2F is a view showing still another example of the roughly channel-shaped configuration.

In addition, the "roughly-channel shaped configuration" in this specification is not limited to the channel shape of the sealing seal 46 shown in FIG. 1 but also includes various configurations in which a part projects from another part. For example, configurations in which one or more projections and one or more recessions are provided at wall surfaces shown in FIGS. 2A to 2E and an arc configuration shown in FIG. 2F are included.

According to the cylindrical roller bearing 41 having the above constitution, a roller length $L_3$ of the roller 44 and an axial width $W_3$ of the inner ring 42 and the outer ring 43 are set within a range of $L_3/W_3 \geqq 0.4$ and a bearing volume $V_3$ of the cylindrical roller bearing 41 and an internal space capacity $C_3$ of the cylindrical roller bearing 41 is set within a range of $0.25 \leqq C_3/V_3 \leqq 0.55$.

When the internal space capacity $C_3$ of the cylindrical roller bearing 41 is set within the above range, an appropriate amount of grease can be enclosed in the bearing. As a result, the roller bearing can be superior in lubricating performance and its maintenance cycle can be lengthened.

In addition, a standard product can be used as the inner ring 42 of the cylindrical roller bearing 41 having the above constitution. Thus, cost of the product can be prevented from being increased. Furthermore, when the bearing is the sealed-type bearing, since a labyrinth structure provided with a peripheral member can be simplified, a motor can be small in size and light in weight.

In addition, according to a bearing having a small ratio of the roller length $L_3$ of the roller 44 to the axial width $W_3$ of the bearing such as $L_3/W_3 < 0.4$, since it is believed that the bearing already has an internal space capacity capable of enclosing an appropriate amount grease, it is eliminated from the object of the present invention.

In addition, in order to set the internal space capacity $C_3$ within the above range, for example, a roller diameter $A_3$ of the roller 44 and a projecting amount $B_3$ from the end faces of the inner ring 42 and the outer ring 43 of the sealing seal 46 are to be set within a range of $0.15 \leqq B_3/A_3 \leqq 1.0$.

Here, when the range is $B_3/A_3 < 0.15$, the appropriate internal space capacity $C_3$ cannot be ensured. Meanwhile, when it is $B_3/A_3 > 1.0$, since grease provided at a position far from the bearing center does not contribute to the lubrication of the bearing, it means nothing in view of improvement in lubricating performance.

Although the cylindrical roller bearing 41 is exemplified in the above embodiment, the present invention can be also applied to various kinds of rolling bearings regardless of whether the rolling body is a ball or not, such as a taper roller bearing, self aligning roller bearing, deep groove ball bearing, four-point contact bearing, and angular ball bearing.

Figure 3:
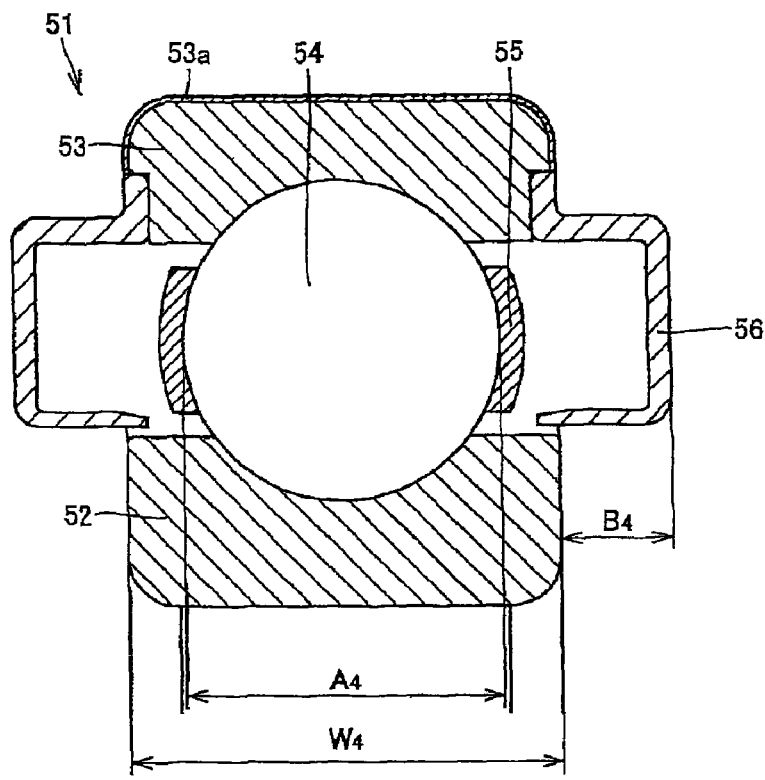
FIG. 3 is a view showing a ball bearing according to another embodiment of the present invention.

For example, in the case of a ball bearing 51 having an inner ring 52, an outer ring 53 having an insulation layer 53$a$, balls 54 as rolling bodies, a retainer 55, and a sealing seal 56 similar to the roller bearing 41 basically, as shown in FIG. 3, when it is assumed that an internal space capacity is $C_4$, a bearing volume is $V_4$, a diameter of the ball 54 is $A_4$, and an axial width of the inner ring 52 and the outer ring 53 is $W_4$, in the case where $A_4/W_4 \geq 0.4$, a range of $0.35 \leq C_4/V_4 \leq 0.55$ is to be set.

Furthermore, to set the internal space capacity $C_4$ within the above range, the diameter $A_4$ of the ball 54 and a projecting amount $B_4$ from the end faces of the inner ring 52 and the outer ring 53 of the sealing seal 56 are to be set within a range of $0.1 \leq B/A \leq 0.6$.

Although the reason for setting the upper limit value and the lower limit value of each range in the ball bearing 51 is the same as that of the cylindrical roller bearing 41 shown in FIG. 1, the specific values are different due to a difference whether the roller 44 is used or the ball 54 is used as the rolling body.

Next, a bearing structure according to another embodiment of the present invention will be described with reference to FIG. 4. In addition, a description of a part in common with the above embodiment will be omitted and a description will be made of a different part mainly.

A cylindrical roller bearing 61 comprises an inner ring 62 and an outer ring 63 having the same axial width, cylindrical rollers 64, a retainer 65, and a sealing seal 66 having a roughly channel-shaped configuration in cross section. In addition, an insulation layer 63a is formed on an outer diameter surface of the outer ring 63.

Furthermore, a labyrinth structure is formed with a peripheral member 67 abutting on the outer ring 63, a peripheral member 68 abutting on the inner ring 62 and integrally rotating with the inner ring 62, and the sealing seal 66.

According to the above constitution, the labyrinth structure can prevent dust from entering from the outside efficiently. As a result, since the grease enclosed in the cylindrical roller bearing 41 can be prevented from deteriorating, the maintenance cycle can be further lengthened.

Figure 5A:
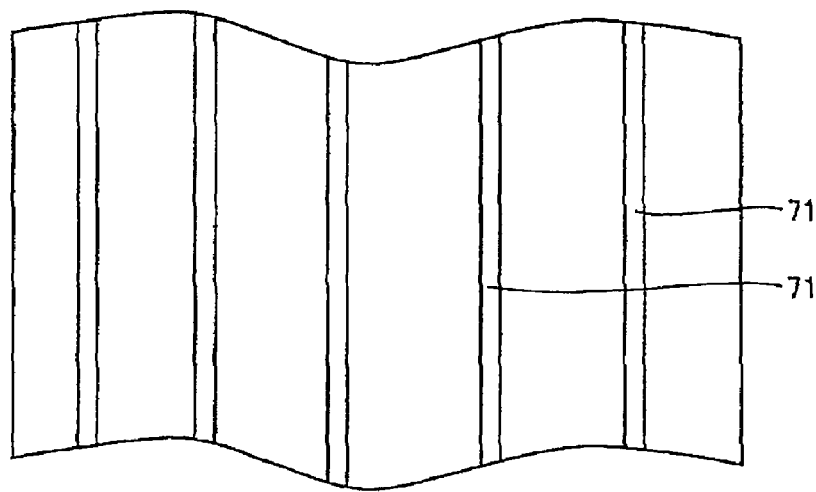
FIG. 5A is a view showing a configuration of a projection and a recession formed in a sealing seal and a peripheral member.

Furthermore, the sealing seal 66 and the peripheral member 68 comprise projections and recessions 66a and 68a formed in their opposed surfaces, respectively and they form circumferential grooves as shown in FIG. 5A. Thus, a sealing effect of the labyrinth structure can be improved.

Figure 4:
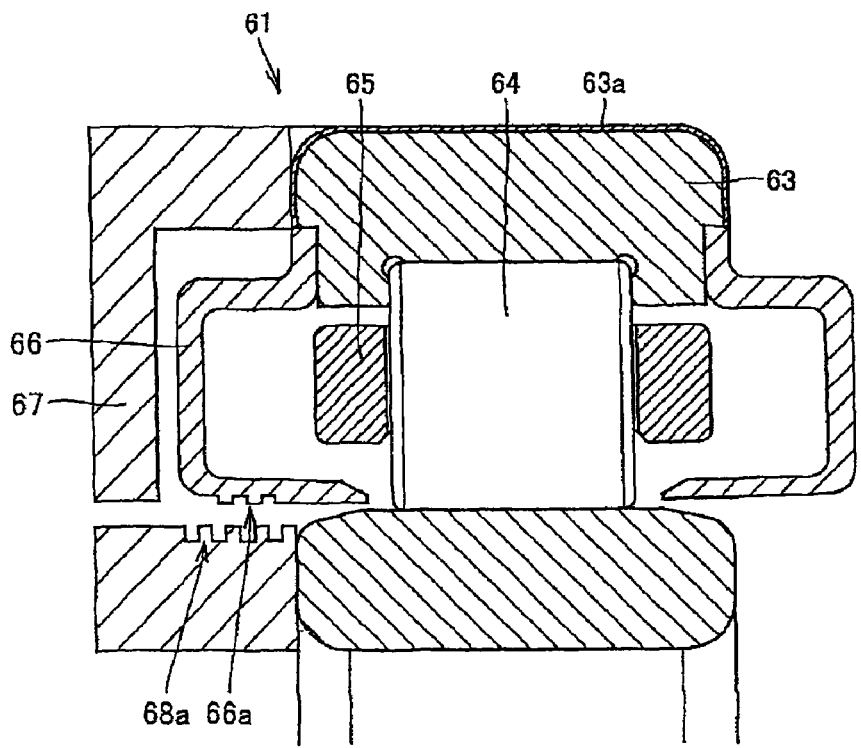
FIG. 4 is a view showing a bearing structure according to one embodiment of the present invention.

In addition, although the labyrinth structure is provided only on the left side of the cylindrical roller bearing 31 in FIG. 4, it may be provided on the right side also. In addition, although the projections and recessions 66a and 68a are only provided in the opposed surfaces of the sealing seal 66 and the peripheral member 67 in the above example, they may be provided in opposed surfaces of the sealing seal 66 and the peripheral member 67. Furthermore, although the peripheral members 67 and 68 abut on the outer ring 63 and the inner ring 62, respectively in the above embodiment, they may not abut on the outer ring 63 and the inner ring 62, respectively.

Figure 5B:
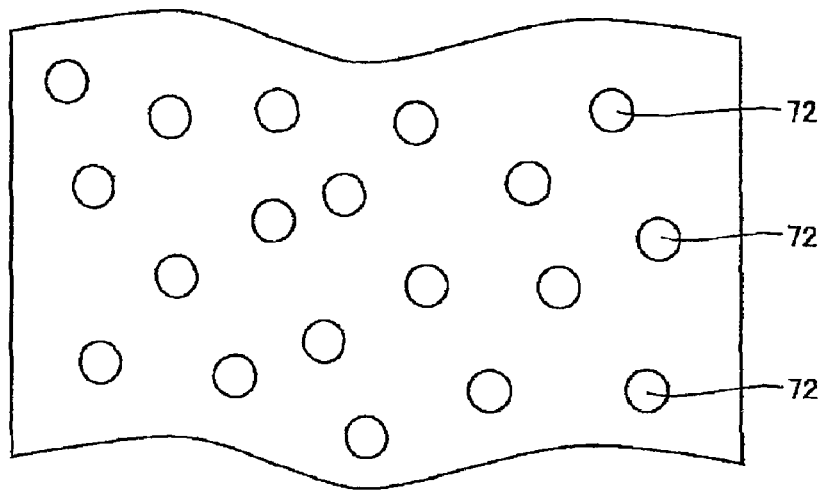
FIG. 5B is a view showing a configuration of a projection and a recession formed in a sealing seal and a peripheral member.
Figure 5C:
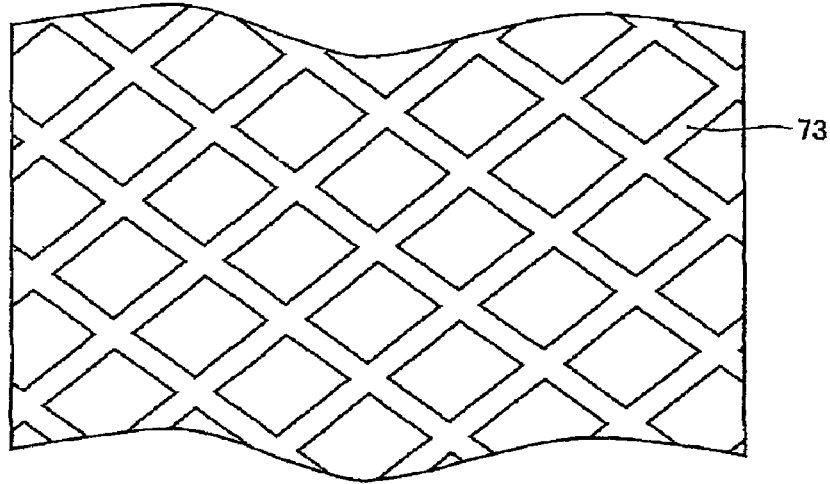
FIG. 5C is a view showing a configuration of a projection and a recession formed in a sealing seal and a peripheral member.

Furthermore, as the projections and recessions 66a and 68a, dimple holes 72 may be formed as shown in FIG. 5B or net-like spiral grooves 73 may be formed as shown in FIG. 5C instead of the circumferential grooves 71 shown in FIG. 5A, to improve the sealing effect of the labyrinth structure.

The adjacent circumferential grooves 71 and the spiral grooves 73 in FIGS. 5A and 5C do not have to be parallel to each other, and they may have any groove width. In addition, the dimple hole in FIG. 5B may have any configuration and size.

Figure 6:
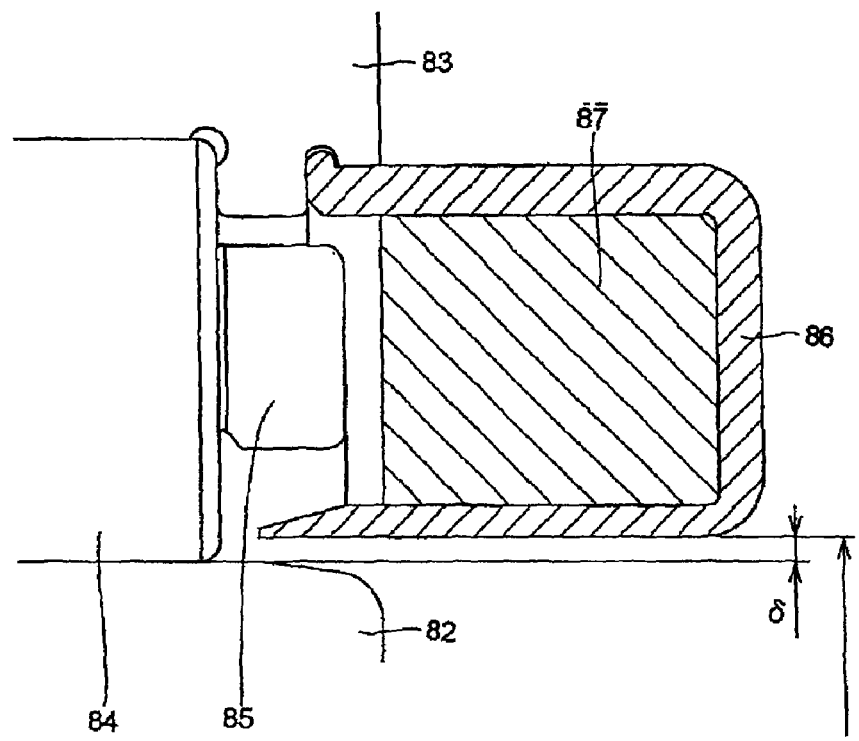
FIG. 6 is a view showing a characteristic part of the present invention and an enlarged view of a part P in FIG. 7.

A cylindrical roller bearing 81 according to still another embodiment of the present invention will be described with reference to FIGS. 6 to 8. In addition, a description of a part in common with the above each embodiment will be omitted and a different part will be described mainly.

Figure 7:
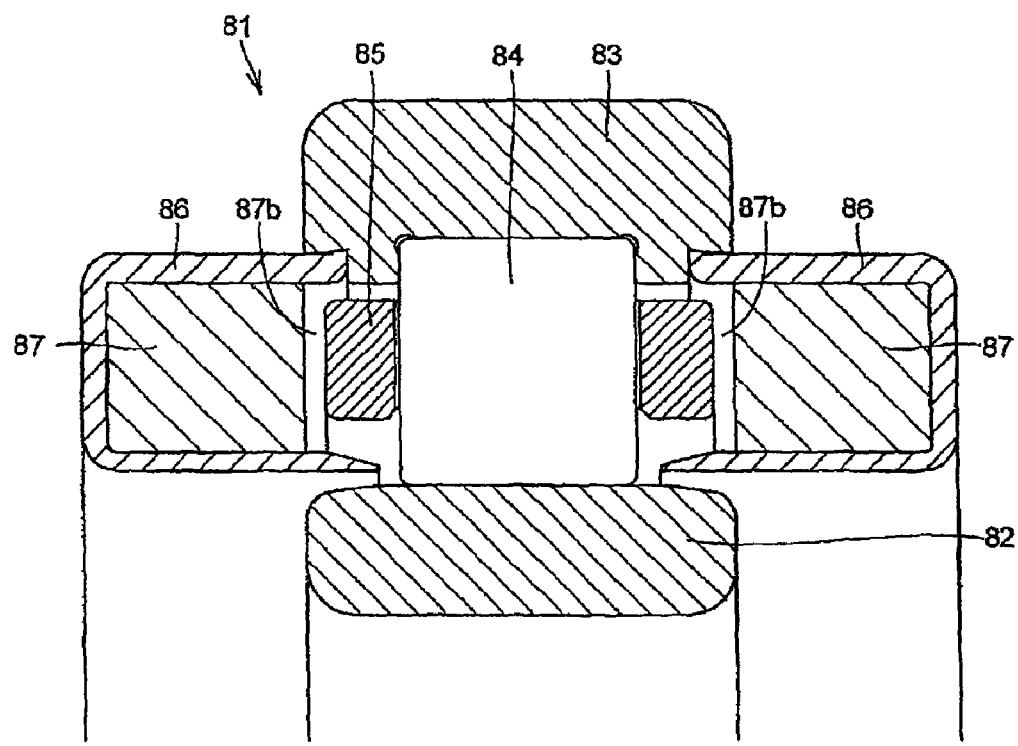
FIG. 7 is a view showing a cylindrical roller bearing according to another embodiment of the present invention.

As shown in FIG. 7, the cylindrical roller bearing 81 comprises an inner ring 82 serving as a rotation side track ring, an outer ring 83 serving as a non-rotation side track ring and having an insulation layer 83a on its outer diameter surface and both end faces, cylindrical rollers 84 serving as rolling bodies and arranged between the inner ring 82 and the outer ring 83, a retainer 85 retaining intervals of the cylindrical rollers 84, and a sealing seal 86 serving as a sealing member and having a channel-shaped configuration in cross section projecting from axial both ends of the inner ring 82 and the outer ring 83.

The sealing seal 86 has a ring shape having a roughly channel-shaped configuration in cross section and projecting from both end faces of the inner ring 82 and the outer ring 83. A grease pocket is provided in the projecting part having the roughly channel-shaped configuration, so that an appropriate amount of grease can be enclosed in the bearing. In addition, the "roughly channel-shaped configuration" is not limited to the channel shape of the sealing seal 86 shown in FIG. 7 but includes various configurations in which a part projects from another part such as one or more projections and one or more recessions formed at a wall surface or an arc shape.

Figure 8:
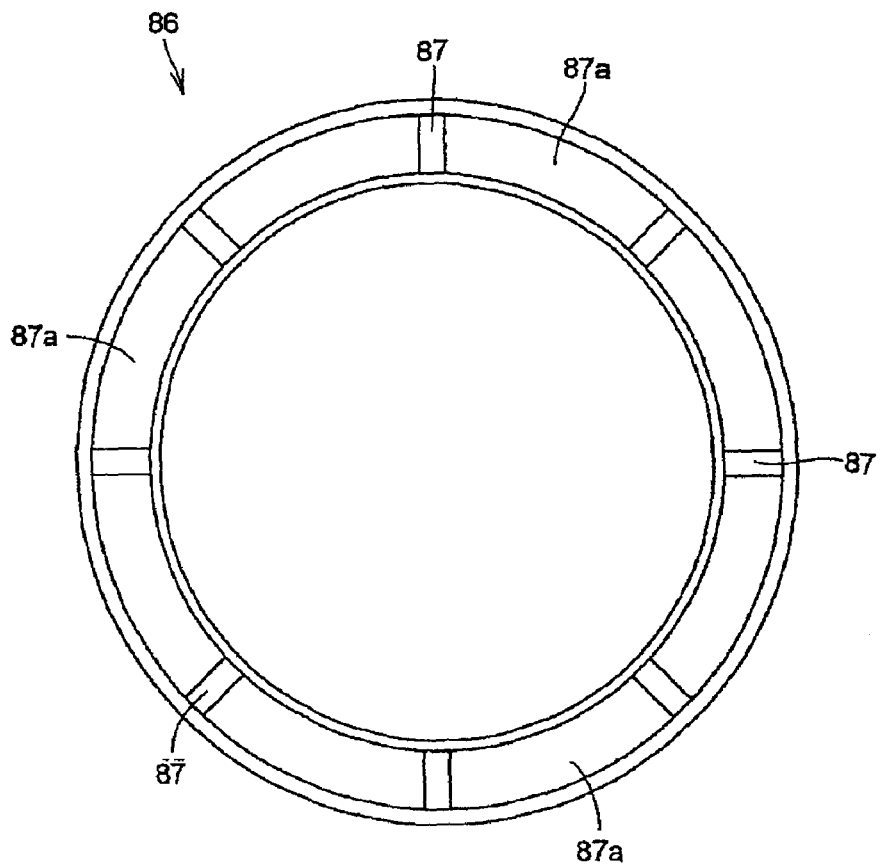
FIG. 8 is a front view showing a sealing seal used in FIG. 7.

In addition, the sealing seal 86 comprises weirs 87 projecting from an inner wall surface and has a plurality of divided regions 87a divided by the weirs 87 circumferentially as shown in FIG. 8, a continuous region 87b provided on the side of an opening end of the sealing seal 86 through the adjacent divided regions 87a as shown in FIG. 7, and at least one grease inlet (not shown) provided in the wall surface of the sealing seal 86. Furthermore, as shown in FIG. 6, when it is assumed that an inner diameter dimension of the sealing seal 86 is "1", a gap "δ" between the wall surface of the sealing seal 86 opposed to the inner ring 82 and the track surface of the inner ring 82 is set within a range of $0.003 \leq \delta/1 \leq 0.015$.

When the gap δ between the inner ring 82 and the sealing seal 86 is set within the above range, the maintenance cycle of the cylindrical roller bearing 81 can be lengthened. In addition, when $\delta/1 \leq 0.003$, the inner ring 82 and the sealing seal 86 could be in contact with each other due to a manufacturing error of the sealing seal 86 and the like. Meanwhile, when $\delta/1 \geq 0.015$, it is difficult to prevent the grease enclosed in the bearing from leaking and dust from entering from the outside of the bearing. As a result, in either case, the bearing life is shortened.

In addition, although the part of the inner ring 82 opposed to the sealing seal 86 is the track surface in the cylindrical roller bearing 81 shown in FIG. 7, in the case of an inner ring having flanges at both ends, a gap between a wall surface of a sealing seal opposed to the inner ring and an outer diameter surface of the flange is defined as δ.

In addition, since the grease pocket is divided into the plurality of divided regions 87a, even when viscosity of the grease is lowered at the time of bearing rotation, the grease enclosed in each divided region 87a can be prevented from entering another divided region 87a, so that the grease can be retained evenly.

When the grease is supplied into the sealing seal 86, the opening end of the sealing seal 86 is sealed with a seal and the like first, and the grease is injected from the grease inlet. When one divided region 87a is filled with the grease in the sealing seal 86, the grease is supplied to the right and left adjacent divided regions 87a through the continuous region 87b. When all divided regions 87a are filled with the grease, the opening end is unsealed to discharge unnecessary grease at the continuous region 87b.

Thus, since the continuous region 87b is provided through the adjacent divided regions 87a, the grease can be supplied from one grease inlet to all the divided regions 87a. As a result, the structure of the sealing seal 86 and the supplying operation of the grease can be simplified. Furthermore, since the continuous region 87b is provided on the opening end side of the sealing seal 86, the grease excessively supplied can be easily removed, so that appropriate amount of grease can be enclosed.

In addition, although the weirs 87 are provided at the equal intervals around the circumference of the sealing seal 86 as shown in FIG. 8, they may be selectively provided at the position in which imbalance of grease can be effectively prevented or any number of weirs 87 may be provided.

In addition, although the sealing seal 86 may be manufactured by pressing metal, or by covering a metal cored bar with an insulation material such as a rubber, it is preferable to manufacture it by injection molding with a resin material to improve the insulation performance of the bearing.

Furthermore, although the inner ring 82 and the outer ring 83 are served as the rotation side track ring and the non-rotation side track ring, respectively and the sealing seal 86 is fixed to the outer ring 83 in the above embodiment, the present invention is not limited to this and can be applied to a bearing in which an inner ring and an outer ring serve as a non-rotation side track ring and rotation side track ring, respectively and a sealing seal is fixed to the inner ring and a gap is provided between the sealing seal and the outer ring.

Figure 10:
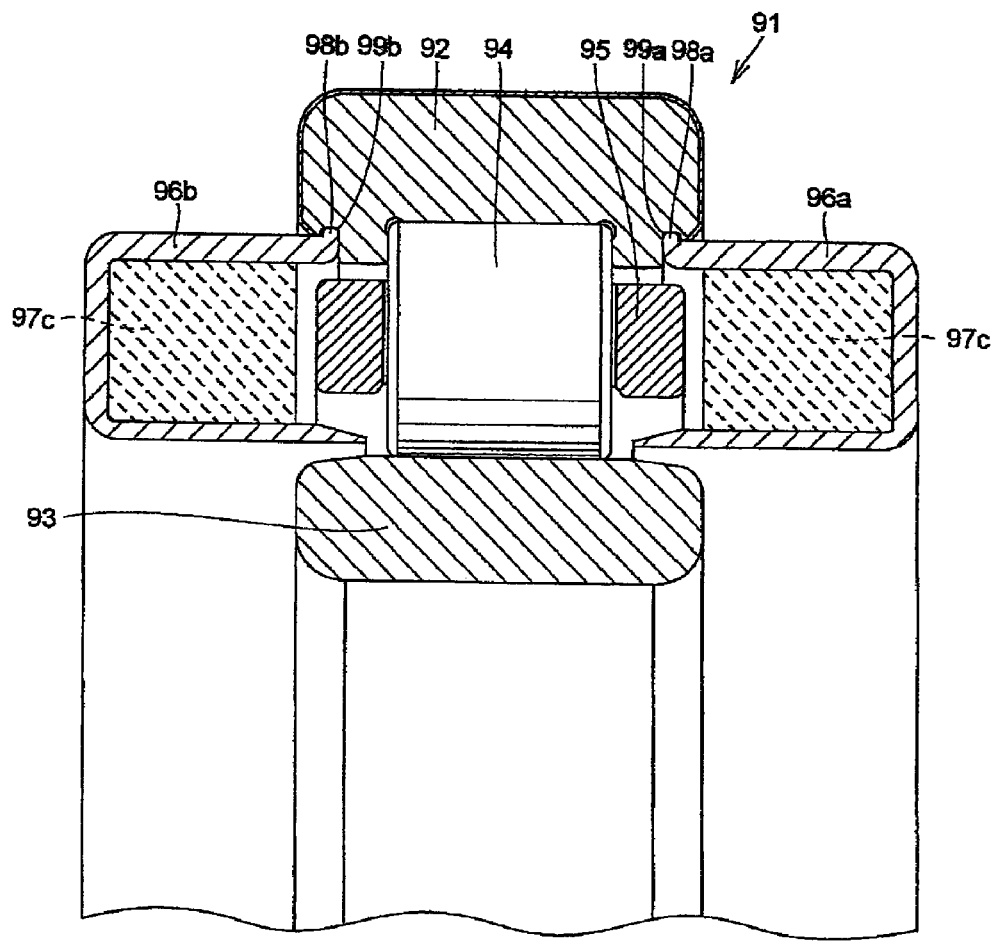
FIG. 10 is a sectional view showing a rolling bearing according to another embodiment of the present invention.
Figure 11:
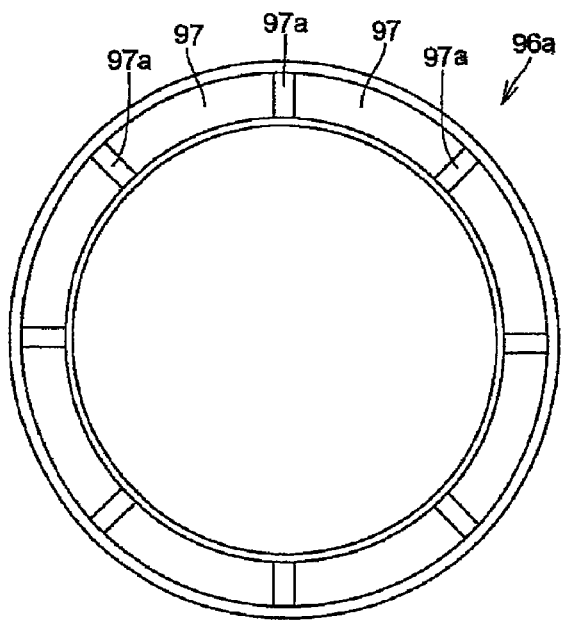
FIG. 11 is a view showing an outline of a seal provided in the rolling bearing.
Figure 12:
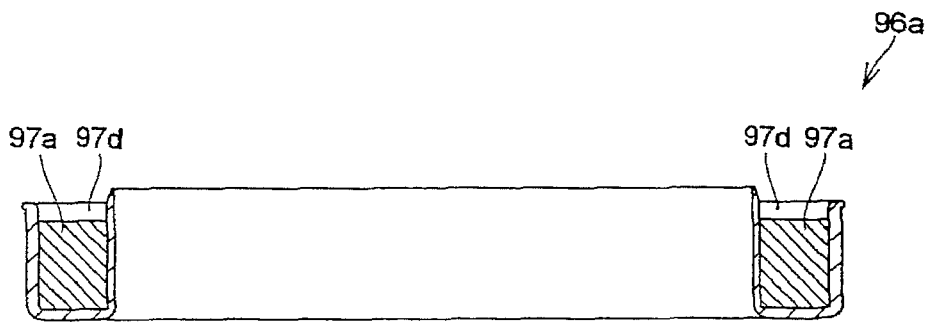
FIG. 12 is a sectional view of the seal shown in FIG. 11.

Still another embodiment of the present invention will be described with reference to the drawings hereinafter. FIG. 10 is a sectional view showing a rolling bearing 91 according to one embodiment of the present invention. FIG. 11 is a view showing an outline of a seal 96a provided in the rolling bearing 91. FIG. 12 is a sectional view of the seal 96a shown in FIG. 11. Referring to FIGS. 10 to 12, the rolling bearing 91 comprises an outer ring 92, an inner ring 93, cylindrical rollers 94 arranged between the outer ring 92 and the inner ring 93, a retainer 95 retaining the cylindrical rollers 94, and a pair of seals 96a and 96b arranged on both sides of the cylindrical roller 94 in an axial direction.

According to the rolling bearing 91, an outer part of the outer ring 92 is mounted on a housing (not shown) and fixed to it. In addition, a spindle (not shown) of a main motor for a railway vehicle is arranged on the inner side of the inner ring 93 so that the spindle is supported. Since electricity flows in the rolling bearing 91, the seals 96a and 96b, the outer ring 92, the inner ring 93, or the cylindrical roller 94 is insulated to prevent electric corrosion.

Each of the seals 96a and 96b are in the form of a ring and has a channel shape in cross section. Here, the channel shape in cross section is not only a strict channel shape in cross section but also the one having a depth in the axial direction at the time of mounting on the rolling bearing 91 such as a U shape or V shape in cross section.

The seals 96a and 96b comprise engaging parts 98a and 98b provided at ends on the outer diameter side of the channel shape, respectively.

When the engaging parts 98a and 98b engage with recessed parts 99a and 99b provided in the outer ring 92 on the inner diameter side, respectively, they are mounted on the rolling bearing 91. Thus, since each of the seals 96a and 96b has a depth in the axial direction, a large amount of grease 97C can be enclosed in a grease pocket 97 of the seals 96a and 96b. Since the seals 96a and 96b have the same constitution, a description of the seal 96b will be omitted.

The seal 96a has a plurality of weir parts 97a arranged at equal intervals circumferentially and the grease pocket 97 holding the grease 97c is provided between the weir parts 97a. Thus, since the plurality of grease pockets 97 are provided in the seal 96a and each grease pocket 97 can be filled with the grease 97c, a large amount of grease 97c can be enclosed. In addition, the weir part 97a does not completely separate the grease pockets 97 so that a continuous space part 97d is provided through the separated grease pockets 97. Therefore, the air and the grease 97c can flow in and out through the grease pockets 97, and this space part 97d is used when the grease 97 is enclosed.

The grease 97c is enclosed in the grease pocket 97 of the above seal 96a first and then mounted on the rolling bearing 91 as described above. Here, a consistency of the enclosed grease 97c is 260 to 300.

Figure 9:
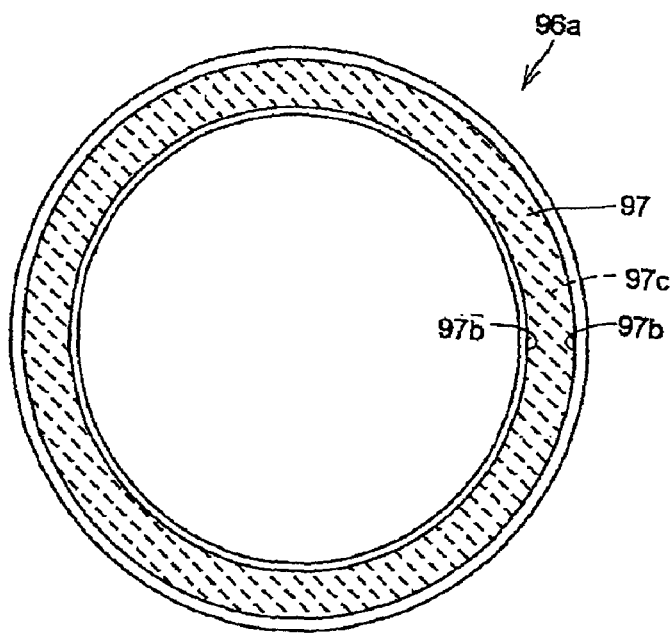
FIG. 9 is a view showing a seal enclosing grease having a consistency of 260 to 300.

FIG. 9 is a view showing a state in which the grease 97c having the consistency of 260 to 300 is enclosed in the seal 96a. Referring to FIG. 9, when the consistency of the grease 97c is 260 to 300, the grease 97 can be enclosed in the grease pocket 97 of the seal 96a without leaving any space. Thus, the seal 96a filled with grease 97c has no wasted space in the grease pocket 97 and has an appropriate amount of grease 97c required to maintain a lubricating property for a long period of time. In addition, since an inner wall surface 97b of the grease pocket 97 is surely in contact with the enclosed grease 97b, retention force of the grease 97b in the seal 96a is high and since the grease has the above consistency at the time of use, the grease 97 does not flow in large amounts at one time, so that the grease 97 flows in gradually toward the rolling bearing 91.

Figure 23:
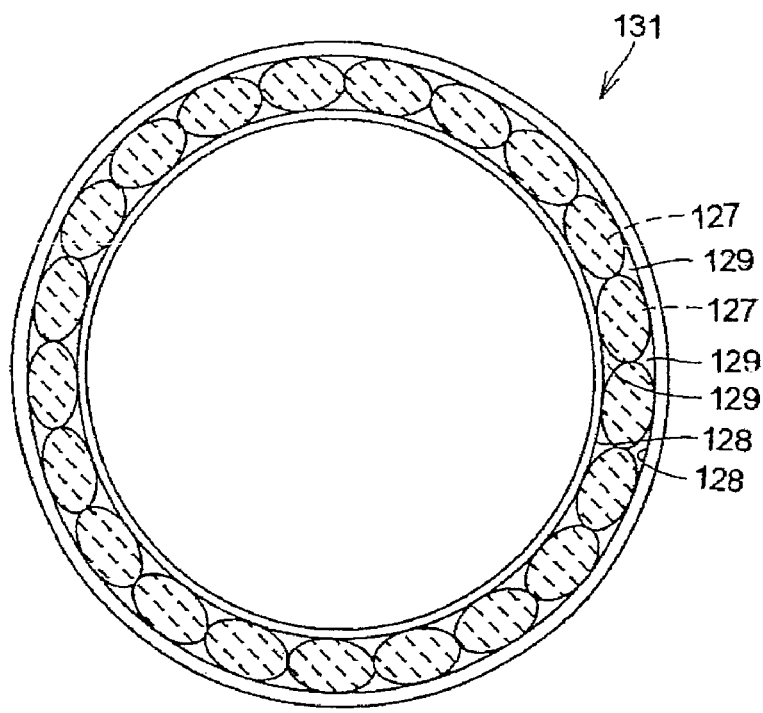
FIG. 23 is a view showing grease having a consistency of 260 or less enclosed in a seal.

Meanwhile, when the consistency of the grease 97c is less than 260, since the grease 97c is in a hard state, a space is generated in the grease pocket 97 of the seal 96a after the grease 97c has been enclosed as shown in FIG. 23. In this case, the appropriate amount of grease 97c required to maintain the lubricating property for a long period of time cannot be enclosed. Furthermore, since the inner wall surface 22a of the grease pocket 97 is partially not in contact with the grease 97c, the retention force of the grease 97c in the grease pocket 97 is lowered.

In addition, when the consistency of the grease 97c is more than 300, the grease 97c is in a soft state. In this case, although a space is not generated in the grease pocket after the grease has been enclosed, the grease 97c has a high fluidity and the retention force of the grease 97c in the grease pocket 97 is low, so that a large amount of grease 97c could flow into the rolling bearing 91 at one time.

Thus, when the consistency of the grease 97c to be enclosed is set to 260 to 300, a space is not generated when the grease 97c is enclosed and the grease 97c does not flow rapidly at the time of use. Thus, the lubricating property of the rolling bearing 91 can be maintained for a long period of time, and the life of the rolling bearing 91 provided with the seal 96a enclosing the grease 97c can be lengthened.

In addition, in this case, instead of specifying the consistency of the grease 97c, a base oil viscosity of the grease at 40° C. may be defined by 90 to 150 cSt (centi-stokes) or 0.00009 to 0.00015 m²/S. As the grease 97c comprises base oil (lubricant oil), a thickening agent, an additive agent and the like, when the base oil viscosity at 40° C. having a correlation with the consistency is defined by the above values, the grease 97c can be appropriately held in the grease pocket 97, so that the grease 97c can be appropriately retained in the grease pocket and the lubricating property can be maintained in the rolling bearing 91 for a long period of time.

In addition, a spindle support structure of a main motor for a railway vehicle in which the rolling bearing 91 and a spindle of the main motor for the railway vehicle are provided and the spindle is supported by the rolling bearing 91 can be used for a long period of time.

In addition, although the rolling bearing 91 comprises the pair of seals 96a and 96b each having the grease pocket 97 with a depth in the axial direction in the above embodiment, it may comprise only the seal 96a or the seal 96b having the grease pocket 97. In addition, although the grease pocket 97 of the seals 96a and 96b is separated by the plurality of weir parts 97a in the above embodiment, each of the seals 96a and 96b may have one grease pocket 97 without any weir part 97a.

A cylindrical roller bearing 101 according to still another embodiment of the present invention will be described with reference to FIGS. 13A, 13B and 14. In addition, a description of a part in common with the above each embodiment will be omitted and a different part will be described mainly.

Figure 14:
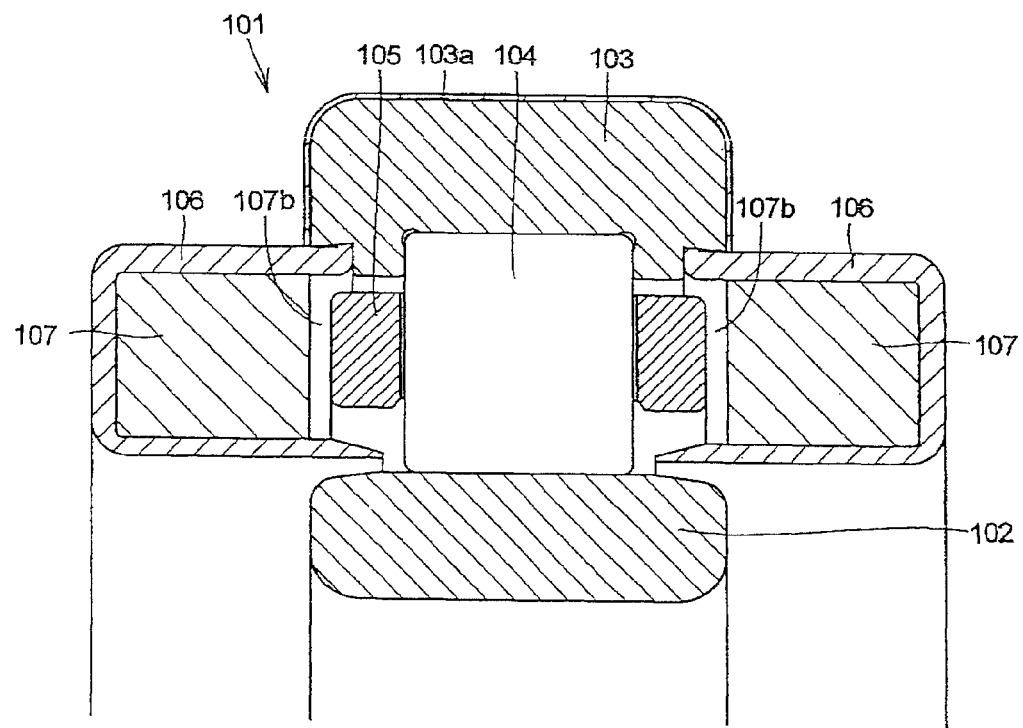
FIG. 14 is a view showing a cylindrical roller bearing according to another embodiment of the present invention.

As shown in FIG. 14, the cylindrical roller bearing 101 comprises an inner ring 102, an outer ring 103 having an insulation layer formed on an outer diameter surface and both end faces thereof, cylindrical rollers 104 as rolling bodies arranged between the inner ring 102 and the outer ring 103, a retainer 105 retaining intervals of the cylindrical rollers 104, and a sealing seal 106 as a sealing member to seal both ends of the bearing. In addition, the insulation layer is formed by spraying an insulation material such as ceramics.

The sealing seal 106 is a resin seal manufactured by injection molding with a resin material and has a roughly channel-shaped configuration in cross section projecting from both end faces of the inner ring 102 and the outer ring 103 and functions as a grease pocket also. In addition, the "roughly channel-shaped configuration" in this specification includes not only the channel shape of the sealing seal 106 shown in FIG. 14 but also various configurations in which a part projects from another part.

Figure 13A:
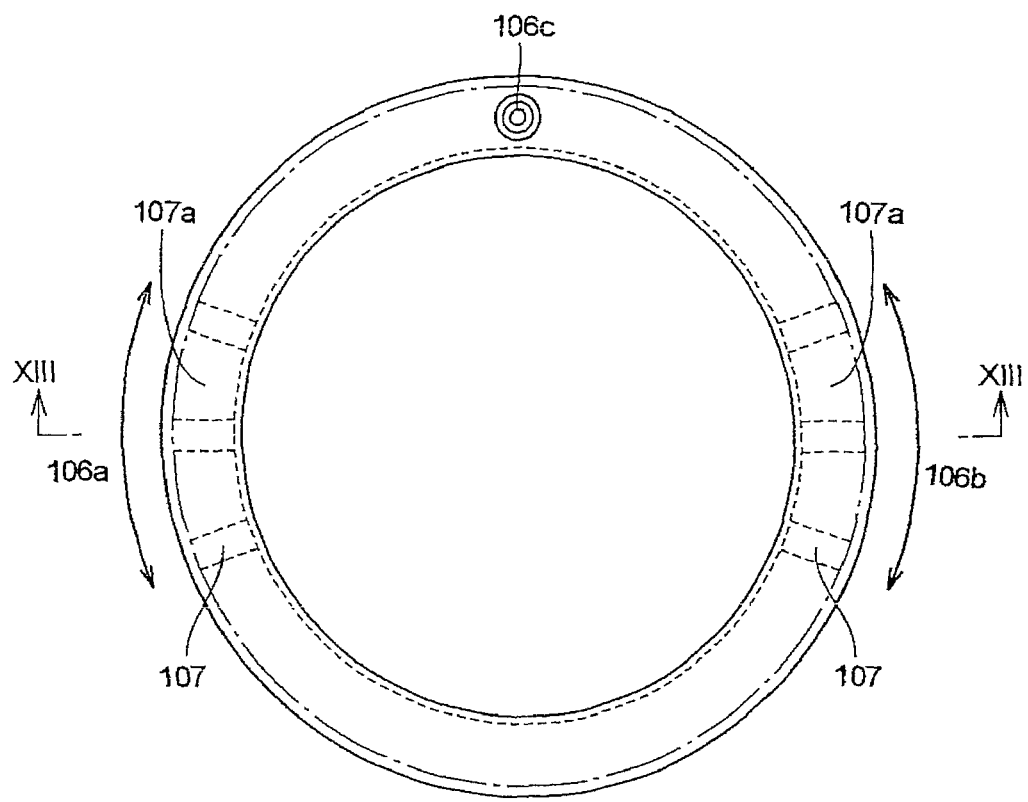
FIG. 13A is a view showing a characteristic part of the present invention and a front view showing a sealing seal used in a cylindrical roller bearing shown in FIG. 14.
Figure 13:
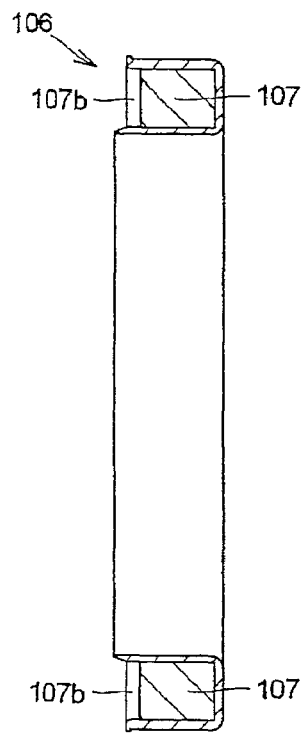
FIG. 13B is a view showing the characteristic part of the present invention and a sectional view taken along a line XIII-XIII in FIG. 13A.

The sealing seal 106 comprises weir parts 107 projecting from an inner wall surface, a plurality of divided regions 107a divided by the weir parts 107 circumferentially as shown in FIG. 13A, a continuous region 107b passing through the divided regions 107a on the opening end side of the sealing seal 106 as shown in FIG. 13B, an identification mark 106c to specify the position of the weir 107, on an outer wall surface, and at least one grease inlet (not shown) in a wall surface of the sealing seal 106.

The sealing seal 106 comprises a first weir part 106a and a second weir part 106b provided at positions at an angle of almost 180° to the center of the sealing seal 106, and the plurality of weirs 107 are provided in each of the first weir part 106a and the second weir part 106b. Thus, the identification mark 106c is arranged at a position at an angle of almost 90° from the first weir part 106a and the second weir part 106b to the center of the sealing seal 106.

As described above, since the first weir part 106a and the second weir part 106b are arranged at the positions at the angle of almost 180° to the center of the sealing seal 106, in the case where a rotation shaft extending in the horizontal direction is supported, the imbalance of grease can be effectively prevented by arranging the first weir part 106a and the second weir part 106b on the left and right sides of the rotation shaft.

Furthermore, since the position of the weir part 106a can be specified from the outside by the identification mark 106c, it is not necessary to dismount the sealing seal to confirm it at the time of mounting on the bearing, so that an assembling operation can be simplified. In addition, according to this embodiment, when the identification mark 106c is arranged on the upper side or lower side of the rotation shaft, the first weir part 106a and the second weir part 106b can be arranged on the left and right sides of the rotation shaft.

In addition, each of the first weir part 106a and the second weir part 106b may have only one weir 107, but when the plurality of weirs are provided, the effect to prevent the imbalance of the grease can be enhanced.

In addition, although the identification mark 106c may be marked on the outer wall of the sealing seal 106, a projection formed at the position corresponding to the resin inlet at the time of injection molding may be used. Since this projection is surely formed at the time of injection molding, when this is used, it is not necessary to newly provide a process for forming the mark 106c, so that the manufacturing step is prevented from being increased.

In addition, although the identification mark 106c is provided on a bottom wall of the sealing seal 106 in the above constitution, the present invention is not limited to this and it may be provided on an outer wall surface in the radial direction or may be provided on an inner wall surface in the radial direction on the condition that it can be seen from the outside.

Furthermore, since the insulation layer is formed on the outer diameter surface and both end surfaces of the outer ring 103, and the sealing seal 106 is formed of a high-insulating resin material as described above, the insulation performance of cylindrical roller bearing 101 can be improved as a whole.

Next, a method of supplying the grease to the above sealing seal 106 will be described. First, the opening end of the sealing seal 106 is closed and the grease is supplied from the grease inlet. After one divided region 107a has been filled with the grease in the sealing seal 106, the grease is moved to right and left adjacent divided regions 107a through the continuous region 107b. After all the divided regions 107a are filled with the grease, the opening end is opened and unnecessary grease at the continuous region 107b is removed.

Thus, since the continuous region 107b passing through all the adjacent divided regions 107a is provided, the grease can be supplied to all the divided regions 107a from the one grease inlet. Thus, the structure of the sealing seal 106 and the operation for supplying the grease can be simplified. In addition, since the continuous region 107b is provided on the opening end side of the sealing seal 106, the grease excessively supplied can be easily removed, so that an appropriate amount of grease can be enclosed.

In addition, although the continuous region 107b is provided on the opening side of the sealing seal 106 shown in FIGS. 13A and 13B, it may be provided on the outer side in the radial direction or inner side in the radial direction. Furthermore, the continuous regions 107b may be provided at a plurality of positions by combining the above examples.

A cylindrical roller bearing 111 according to still another embodiment of the present invention will be described with reference to FIGS. 15, 16A and 16B. In addition, a description of a part in common with the above each embodiment will be omitted and a different part will be described mainly.

Figure 15:
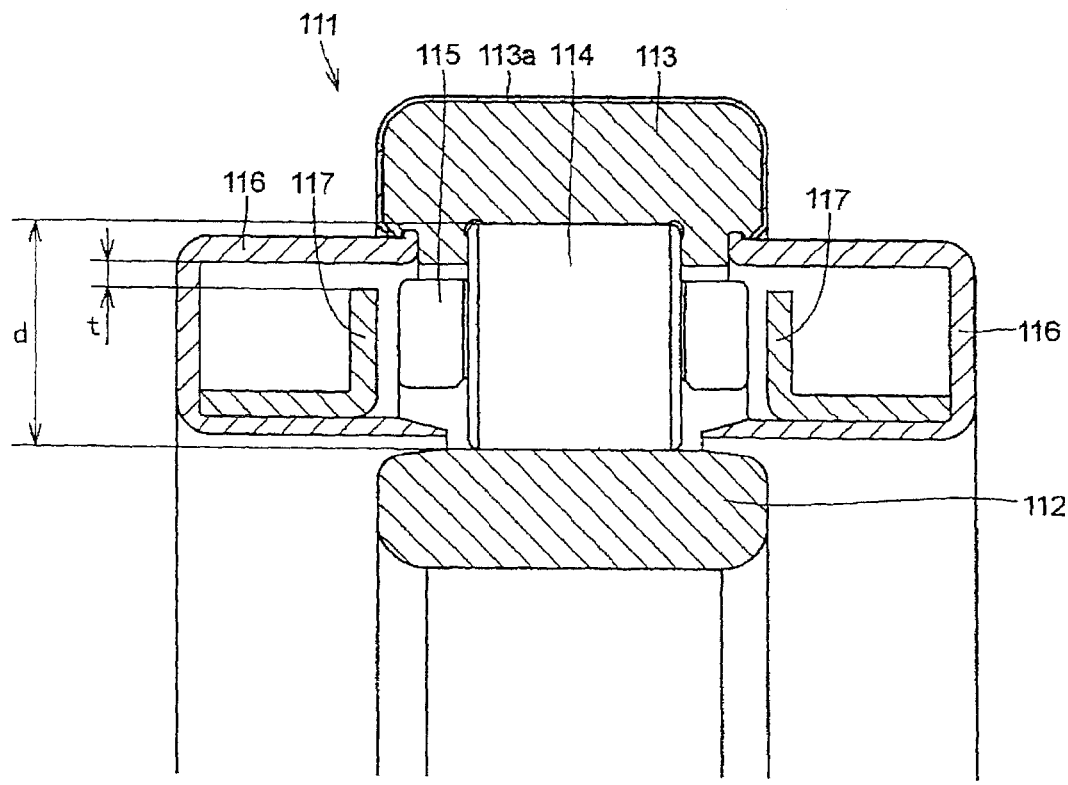
FIG. 15 is a view showing a cylindrical roller bearing according to still another embodiment of the present invention.

As shown in FIG. 15, the cylindrical roller bearing 111 comprises an inner ring 112 and an outer ring 113 as track rings, cylindrical rollers 114 as rolling bodies arranged along the track surfaces of the inner ring 112 and the outer ring 113, a retainer 115 retaining intervals of the cylindrical rollers 114, a sealing seal 116 as a sealing member to seal both ends of the bearing, and a weir 117 covering a part of an opening end of the sealing seal 116.

Since the cylindrical roller bearing 111 is used as a bearing to support a main motor for a railway vehicle and the like, an insulation layer is formed on an outer diameter surface and both end surfaces of the outer ring 113 in order to ensure insulation performance. In addition, the insulation layer is formed by spraying an insulation material such as ceramics.

The sealing seal 116 is a resin seal manufactured by injection molding with a resin material and has a roughly channel-shaped configuration in cross section projecting from both end faces of the inner ring 112 and the outer ring 113, and functions as a grease pocket also. In addition, the "roughly channel-shaped configuration" in this specification includes not only the channel shape of the sealing seal 116 shown in FIG. 15 but also various configurations in which a part projects from another part such as one or more projection and one or more recessions formed on a wall surface or an arc shape.

Figure 16A:
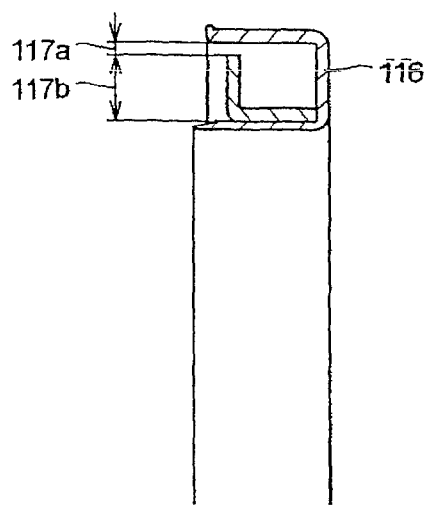
FIG. 16A is a side view showing a sealing seal used in FIG. 15.
Figure 16B:
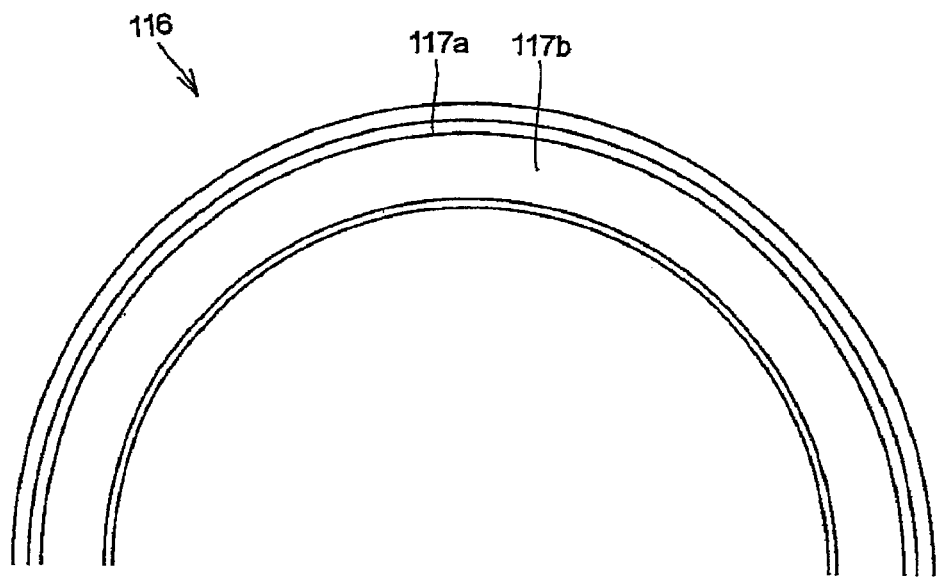
FIG. 16B is a front view showing the sealing seal used in FIG. 15.
Figure 17:
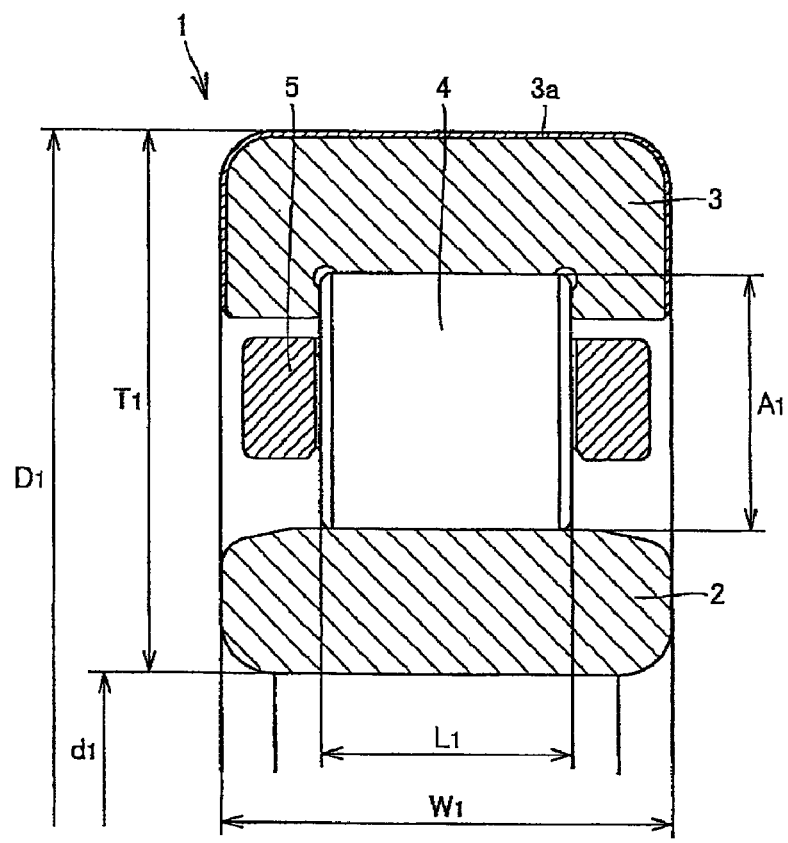
FIG. 17 is a view showing a conventional standard roller bearing.
Figure 18:
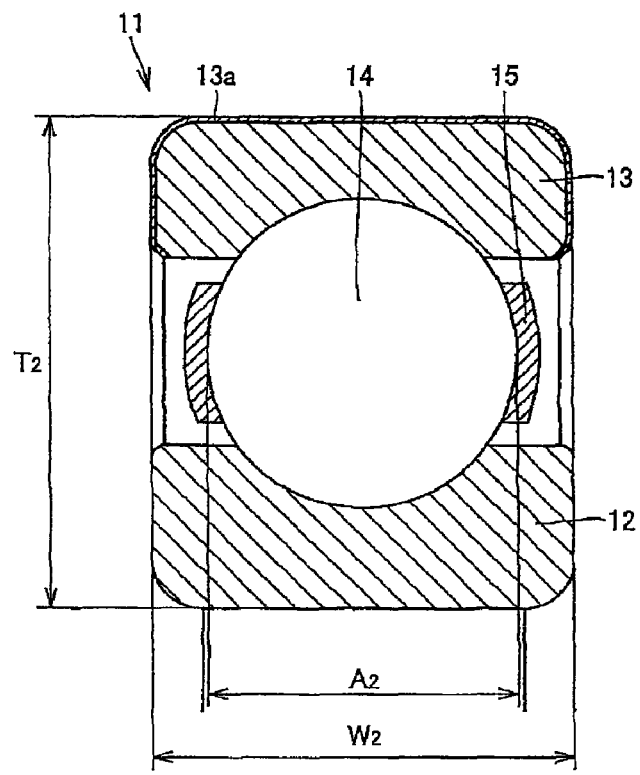
FIG. 18 is a view showing a conventional standard ball bearing.
Figure 19:
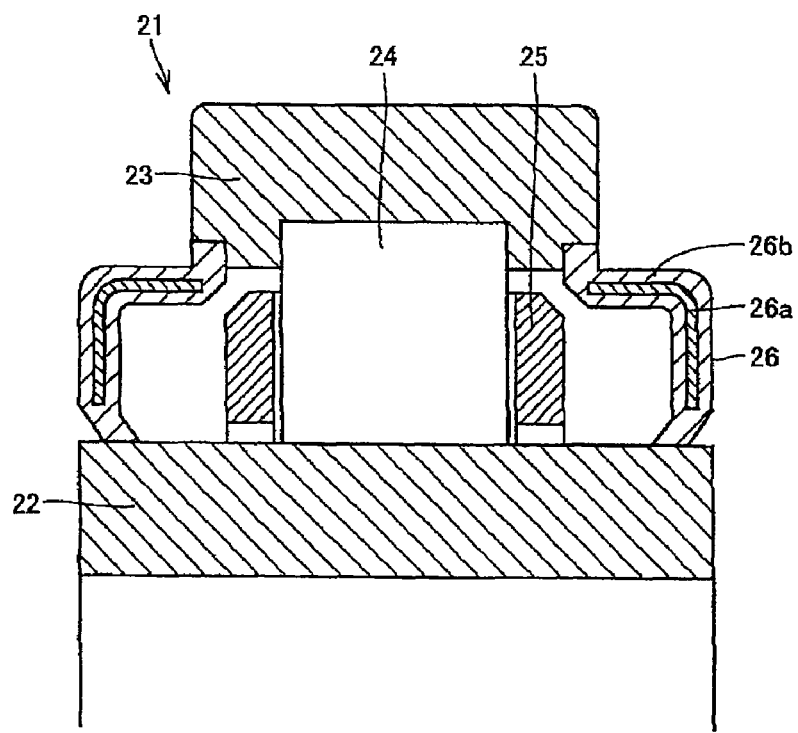
FIG. 19 is a view showing one example of a roller bearing in which an axial width of an inner ring is larger than that of an outer ring and a bearing internal space is enlarged.
Figure 20:
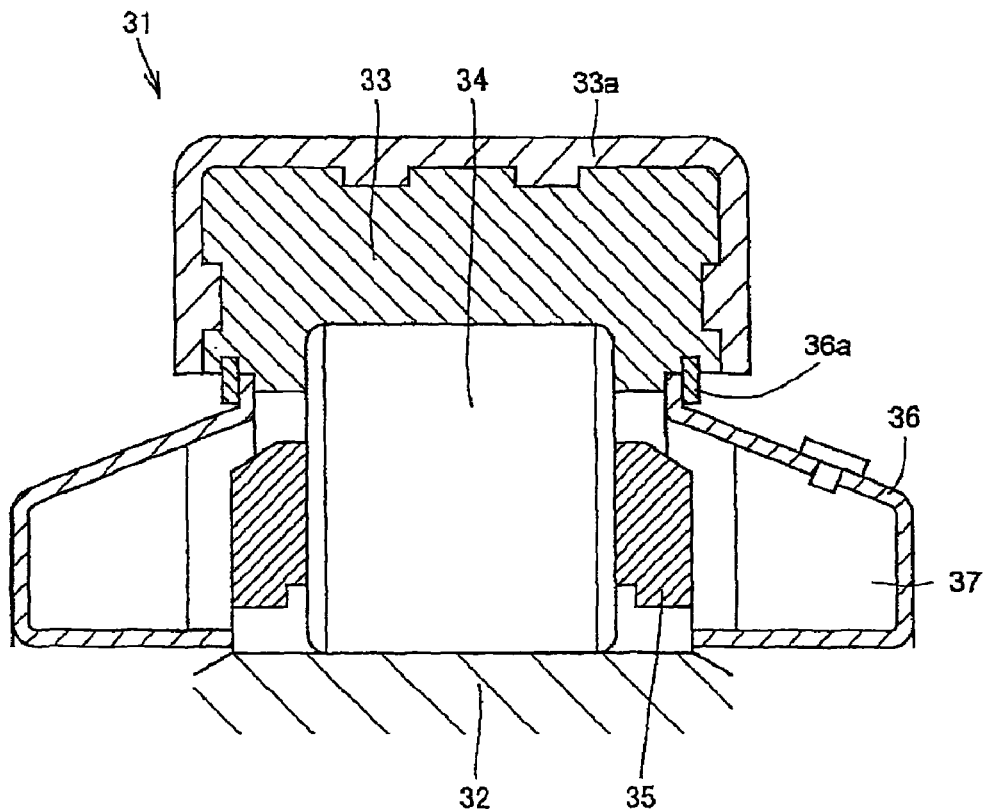
FIG. 20 is a view showing another example of a roller bearing in which a sealing seal projects from end faces of an inner ring and an outer ring and a bearing internal space is enlarged.
Figure 21:
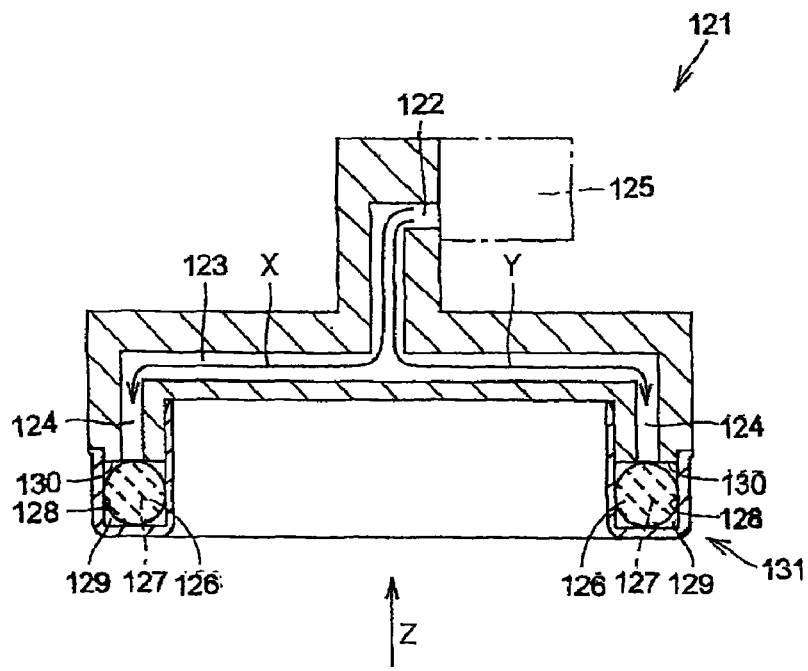
FIG. 21 is a sectional view showing a part of a conventional grease enclosing device.
Figure 22:
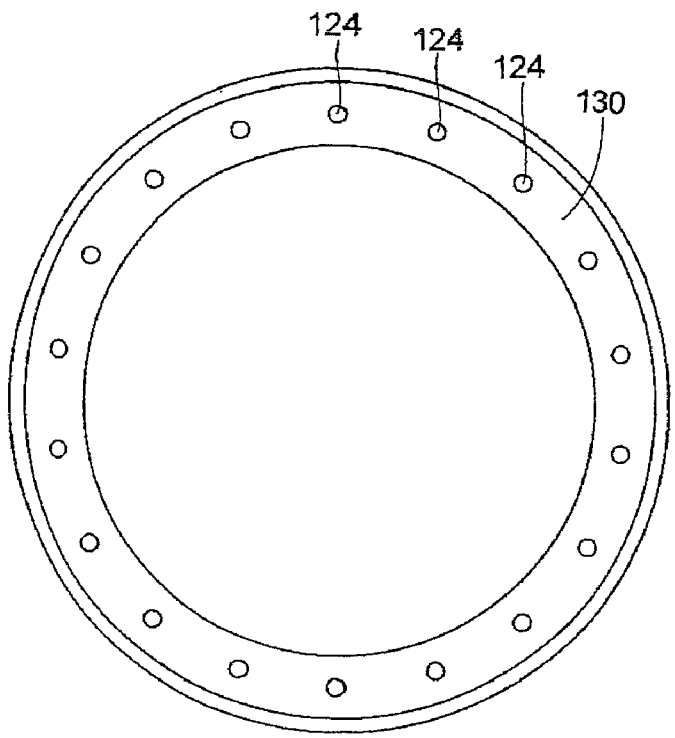
FIG. 22 is a view showing the grease enclosing device shown in FIG. 21 seen from a direction of an arrow Z in FIG. 21.

In addition, as shown in FIGS. 16A and 16B, the opening end of the sealing seal 116 comprises an opening 117a through which the grease can flow in the bearing and a closed part 117b to prevent the grease from flowing in, and the weir 117 is continuously provided in the circumferential direction of the sealing seal 116. At this time, when it is assumed that a roller diameter of the cylindrical roller is "d", a radial dimension "t" of the opening 117a is set within a range of 1 mm$\leq$t$\leq$0.4d.

According to the cylindrical roller bearing 111 having the above constitution, the bearing and the grease pocket are filled with grease. When the cylindrical roller bearing 111 is rotated, the grease in the bearing is brought to the outside in the radial direction by centrifugal force. As a result, a grease layer having a certain thickness is formed in a space from the inner diameter surface of the outer ring 113 in the vicinity of the cylindrical roller 114 to the grease pocket through the opening 117a.

Here, as the rolling surface of the cylindrical roller 114 is lubricated with base oil of the grease existing on the inner diameter surface of the outer ring 113, an amount of the base oil in the vicinity of the cylindrical roller 114 is reduced over time. Thus, the base oil of the grease is moved from the grease in the grease pocket through the layer of the grease, so that the reduced amount of the base oil in the vicinity of the cylindrical roller 114 can be supplied.

In addition, when the radial dimension "t" is less than 1 mm, the opening 117a is too small to prevent smooth flow of the grease. Meanwhile, when the radial dimension "t" is beyond 40% of the roller diameter "d" of the cylindrical roller 114, since the opening 117a is too large and the weir 117 cannot serve as resistance against excessive influx of the grease, the dimension "t" has to be set within the range of 1 mm$\leq$t$\leq$0.4d.

When the sealing seal 116 having the grease pocket is constituted as described above, an appropriate amount of grease can be supplied into the bearing. As a result, the cylindrical roller bearing 111 can prevent a temperature from rising due to excessive supply of the grease and burning due to lack of the grease.

Here, although the opening 117a may be provided on the inner side of the sealing seal 116 in the radial direction, it is preferable to provide it on the outer side of the sealing seal 116 in the radial direction in the case of the inner ring rotation type of bearing as shown in FIG. 15. This is because when the grease in the grease pocket flows in the bearing along the wall surface of the sealing seal 116, in the case of the inner ring rotation type of bearing, it flows in along an outer wall surface in the radial direction due to centrifugal force of the rotation of the inner ring.

Although the sealing seal having the above constitution may be manufactured by pressing metal or by covering a metal cored bar with an insulation material such as a rubber, it is preferable to manufacture it by injection molding with a resin material when it is used in a circumstance requiring high insulation performance. When the insulation layer is formed on the outer diameter surface and both end faces of the outer ring 113, and the sealing seal 116 is formed of the resin material having high insulation performance, the insulation performance can be improved in the cylindrical roller bearing 111 as a whole.

In addition, it is preferable that the sealing seal 116 and the weir are manufactured separately as different members and then combined. As shown in FIGS. 15, 16A and 16B, although the sealing seal 116 and the weir 117 themselves are simple in structure, combined configuration of them is complicated. Especially, when both members are formed integrally, it is difficult to manufacture them by injection molding with a resin material. Thus, the sealing seal 116 and the weir 117 are separately manufactured and then combined to simplify the manufacturing process.

In addition, it is preferable that the sealing seal 116 and the weir 117 are formed of the same kind of material such as metal or resin. This is because when linear expansion coefficients of both members are different, the radial dimension "t" of the opening 117a could be varied or one could damage the other while the bearing is rotated.

In addition, although the cylindrical roller bearing in which the insulation layer is provided on the outer diameter surface and both end faces of the outer ring is exemplified in the above each embodiment, an insulation layer may be formed on an inner diameter surface and both end faces of the inner ring. Since the inner diameter surface of the inner ring has a small spraying surface as compared with the outer diameter surface of the outer ring, when the insulation layer is sprayed to the inner diameter surface of the inner ring, spraying cost can be reduced. In addition, the present invention can be applied to a bearing having no insulation layer.

In addition, although the cylindrical roller bearing 111 is exemplified in the above embodiment, the present invention can be applied to various kinds of rolling bearings regardless of whether the rolling body is a ball or not, such as a needle roller bearing, long roller bearing, taper roller bearing, self aligning roller bearing, deep groove ball bearing, four-point contact bearing, and angular ball bearing.

In addition, although a description has been made of the case where the rolling bearing 91 is used in the main motor of the railway vehicle in the above embodiment, the present invention is not limited to this and may be applied to a rolling bearing used in a long-term maintenance-free circumstance, such as a general-purpose motor and a bearing for a windmill.

Furthermore, a synergetic effect can be expected in the present invention by combining the characteristic parts in the above embodiments arbitrarily.

INDUSTRIAL APPLICABILITY

Since the rolling bearing according to the present invention is long in life and durable for a long period of time, it can be effectively used in a case where a long maintenance cycle is required, such as the spindle support structure of the main motor for the railway vehicle.

The invention claimed is:

1. A rolling bearing as a ball bearing comprising:
   an inner ring;
   an outer ring having the same axial width as said inner ring;
   balls arranged between said inner ring and said outer ring; and
   a sealing member having a roughly channel-shaped configuration in cross section projecting from both end faces of said inner ring and said outer ring, wherein
   a relation between a diameter A of said ball and an axial width W of said inner ring and said outer ring satisfies $A/W \geq 0.4$, and a relation between a bearing volume V of said ball bearing and an internal space capacity C of said ball bearing satisfies $0.35 \leq C/V \leq 0.55$.

2. The rolling bearing according to claim 1, wherein
   a relation between the diameter A of said ball and a projecting amount B of said sealing member from the end faces of said inner ring and said outer ring satisfies $0.1 \leq B/A \leq 0.6$.

* * * * *